US011416764B2

(12) United States Patent
Millius et al.

(10) Patent No.: US 11,416,764 B2
(45) Date of Patent: Aug. 16, 2022

(54) AUTOMATIC GENERATION AND TRANSMISSION OF A STATUS OF A USER AND/OR PREDICTED DURATION OF THE STATUS

(71) Applicant: Google Inc., Mountain View, CA (US)

(72) Inventors: Sebastian Millius, Zurich (CH); Sandro Feuz, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 830 days.

(21) Appl. No.: 15/412,510

(22) Filed: Jan. 23, 2017

(65) Prior Publication Data

US 2018/0211178 A1 Jul. 26, 2018

(51) Int. Cl.
*G06N 20/00* (2019.01)
*H04L 67/12* (2022.01)
(Continued)

(52) U.S. Cl.
CPC ............. *G06N 20/00* (2019.01); *G06Q 10/10* (2013.01); *G07C 1/00* (2013.01); *H04L 67/12* (2013.01); *H04L 67/22* (2013.01)

(58) Field of Classification Search
CPC .......... G06Q 10/10; G06Q 10/04; G07C 1/00; H04L 67/12; H04L 67/22; G06N 20/00; G06N 7/00
See application file for complete search history.

(56) References Cited

U.S. PATENT DOCUMENTS 7,444,379 B2 10/2008 Becker et al.
8,996,639 B1* 3/2015 Faaborg ................. H04L 51/02
455/412.1
(Continued)

FOREIGN PATENT DOCUMENTS

CA 2893539 6/2014
CN 101150542 3/2008
(Continued)

OTHER PUBLICATIONS

United Kingdom Intellectual Property Office; Examination Report issued in Application No. 1717536.5 dated Apr. 4, 2018.
(Continued)

*Primary Examiner* — Omar F Fernandez Rivas
*Assistant Examiner* — Selene A. Haedi
(74) *Attorney, Agent, or Firm* — Middleton Reutlinger

(57) ABSTRACT

Automatically generating and/or automatically transmitting a status of a user. The status is transmitted for presentation to one or more additional users via corresponding computing device(s) of the additional user(s). Some implementations are directed to determining both: a status of a user, and a predicted duration of that status; and generating a status notification that includes the status and that indicates the predicted duration. Some implementations are additionally or alternatively directed to utilizing at least one trust criterion in determining whether to provide a status notification of a user to an additional user and/or in determining what status notification to provide to the additional user. Some implementations are additionally or alternatively directed to training and/or use of machine learning model(s) in determining a status of a user and/or a predicted duration of that status.

16 Claims, 13 Drawing Sheets

(51) Int. Cl.
*G07C 1/00* (2006.01)
*G06Q 10/10* (2012.01)
*H04L 67/50* (2022.01)

(56) References Cited

U.S. PATENT DOCUMENTS

| | | |
|---|---|---|
| 2004/0003042 A1 | 1/2004 | Horvitz et al. |
| 2007/0264969 A1 | 11/2007 | Frank et al. |
| 2011/0029465 A1 | 2/2011 | Ito et al. |
| 2011/0040844 A1* | 2/2011 | Lawler ............ H04L 51/32 709/206 |
| 2014/0207880 A1 | 7/2014 | Malkin et al. |
| 2014/0256363 A1 | 9/2014 | Chiu et al. |
| 2014/0343841 A1 | 11/2014 | Faaborg et al. |
| 2015/0310339 A1* | 10/2015 | Deng ............... G06N 3/02 706/11 |
| 2016/0092432 A1* | 3/2016 | Smadja ............ H04W 4/14 715/733 |
| 2016/0094938 A1 | 3/2016 | Upadhyaya et al. |
| 2016/0286045 A1 | 9/2016 | Shaltiel et al. |
| 2016/0315902 A1 | 10/2016 | Silva et al. |

FOREIGN PATENT DOCUMENTS

| | | |
|---|---|---|
| CN | 101989127 | 3/2011 |
| CN | 102521019 | 6/2012 |
| CN | 104106034 | 10/2014 |
| CN | 105719392 | 6/2016 |
| CN | 105723353 | 6/2016 |
| EP | 2747024 | 6/2014 |
| JP | 2013108910 A | 6/2013 |
| WO | 2012155235 A1 | 11/2012 |
| WO | 2015041668 | 3/2015 |

OTHER PUBLICATIONS

Intellectual Property Office of Singapore; Invitation to Pay Additional Fees for Ser. No. PCT/US2017/059109; 2 pages; dated Feb. 28, 2018.
Intellectual Property Office of Singapore; International Search Report and Written Opinion of Ser. No PCT/US2017/059109; 15 pages; dated Apr. 14, 2018.
China National Intellectual Property Administration; Office Action issued for Application No. 201711144946.5 dated Jun. 3, 2020.
European Patent Office; Communication issue in Application No. 17892907.1; 9 pages; dated May 12, 2020.
China National Intellectual Property Administration; Second Office Action issued in Application No. 201711144946.5; 7 pages; dated Feb. 9, 2021.
China National Intellectual Property Administration; Third Office Action issued in Application No. 201711144946.5; 6 pages; dated Nov. 1, 2021.
European Patent Office; Communication pursuant to Article 94(3) EPC issued in Application No. 17892907.1; 5 pages; dated Nov. 2, 2021.
China National Intellectual Property Administration; Notice of Allowance issued in Application No. 201711144946.5; 6 pages; dated Dec. 10, 2021.

* cited by examiner

AUTOMATIC GENERATION AND TRANSMISSION OF A STATUS OF A USER AND/OR PREDICTED DURATION OF THE STATUS

BACKGROUND

Chat messages and other electronic communications often prompt for a timely reply. However, in some situations a recipient of an electronic communication may be unable or unwilling to reply in a timely manner due to being engaged in another activity such as playing a sport, watching a movie at a cinema, shopping, etc.

Some chat applications allow for a user to manually set a status message (e.g., via a selection from a restricted set of options). The manually set status message will then appear next to the user's contact information when other user(s) view the contact information via corresponding chat applications. However, manually setting status messages may be cumbersome (e.g., require multiple user interface inputs from the user) and/or a user may often forget to update their status (e.g., forget to set the status before engaging in an activity and/or forget to change it back after engaging in the activity).

These and other techniques present additional and alternative drawbacks. For example, a status message of various techniques may not convey any anticipated time that the status, reflected by the status message, may change to another status. Also, for example, according to various techniques the same status message may be indiscriminately sent to each of multiple other users. Additional and alternative drawbacks may be presented by various techniques, and may optionally be addressed by one or more features of this specification.

SUMMARY

This specification is generally directed to automatically generating and/or automatically transmitting a status of a user. The status is transmitted for presentation to one or more additional users via corresponding client device(s) of the additional user(s). The transmission of the status may be to, for example, other client device(s), a server that publishes or otherwise makes available the status for other client device(s), etc. As one example, a client device of the user may generate the status based on data for the user, and the client device may transmit the status over a network interface to one or more additional computing devices. The data for the user may include, for example, sensor-based data that is based on output from sensor(s) of the client device and/or other electronic device(s) of the user, data provided by applications executing on electronic device(s) of the user, historical data of the user, etc.

Some implementations of this specification are directed to determining both: a status of a user, and a predicted duration of that status; and generating a status notification that indicates the status and that indicates the predicted duration. For example, a determined status may be "working out" and a predicted duration may be "30 minutes". A status notification may be generated such as: "working out, reachable in approximately X minutes" (where "X minutes" indicates the minutes remaining in the predicated duration); or "working out, available around HH:MM" (where "HH:MM" indicates a time at the completion of the predicted duration).

In some implementations, determining the predicted duration of a status is based at least in part on sensor-based data generated based on output from one or more sensors of one or more electronic devices of the user. For example, the predicted duration may be determined based on sensor-based data generated based on a global position system (GPS) sensor, an accelerometer, a microphone, a camera, a gyroscope, and/or other sensor(s). In some implementations, determining the predicted duration of a status is based on indirect data that does not directly indicate the duration. In some versions of those implementations, determining the predicted duration is independent of any data that directly indicates the duration. Data that directly indicates the duration of a status is data that explicitly indicates a particular status and that explicitly indicates a duration of that particular status. For example, a calendar entry that directly indicates a status of "In a meeting" and includes an end time for the meeting is data that directly indicates the duration of that status. On the other hand, data that indicates a user is currently engaged in a phone call, without any corresponding data that directly indicates an anticipated duration of the currently engaged-in phone call, is indirect data that does not directly indicate the duration of the phone call. Likewise, various sensor data (e.g., sensor data generated based on a GPS sensor, an accelerometer, a microphone) are indirect data that do not directly indicate duration of a status. As yet another example, historical data of a user (e.g., historical durations of past status(es) of a user) are indirect data that do not directly indicate duration of a status. Rather, they directly indicate only the duration(s) of past status(es).

As described in more detail below, in various implementations the predicted duration of a status is determined based on applying data of a user as input to a machine learning model, generating output over the machine learning model based on the input, and determining the predicted duration based on the output generated over the machine learning model. For example, the predicted duration may be indicated directly by the output. Also, for example, the output may directly indicate the status (without also directly indicating the predicted duration), and the predicted duration may be determined based on a stored association of the status to the predicted duration.

Automatically determining and transmitting the predicted duration of a status of a user for presentation to a computing device of an additional user may provide various technical advantages. For example, the additional user may be apprised of the predicted availability of the user and thereby know when an electronic communication (already sent or to be sent) of the additional user can be expected to be consumed by the user. This prevents consumption of various resources during the predicted duration, such as resources of the computing device of the user, resources of the computing device of the additional user, and/or network resources. For example, the additional user may not need to repeatedly check his/her computing device during the predicted duration to determine if the status of the user has changed (since the predicted duration is known to the additional user upon presentation of the status notification). Also, for example, if the additional user sent an electronic communication to a user and received the predicted duration in response (or otherwise received the predicted duration), the additional user may not need to repeatedly check his/her computing device during the predicted duration to determine if the user has replied (since the additional user knows a reply isn't likely until the end of the predicted duration). Also, for example, the additional user may not send a follow-up electronic communication during the predicted duration since the additional user knows a delay in reply by the user is expected for at least the predicted duration. As another example, the automatic determination and transmission of the predicted duration may obviate the need for tedious user input by the user to set the status. Moreover, the predicted duration may be utilized to automatically adjust the status of the user at the end of the predicted duration, obviating the need for further tedious user input.

Some implementations of this specification are additionally or alternatively directed to utilizing at least one trust criterion in determining whether to provide a status notification of a user to a particular additional user and/or in determining what status notification to provide to the additional user. In some of those implementations, a status notification of a user may be provided to the particular additional user only if the particular additional user satisfies the trust criterion. For example, assume the trust criterion is that the additional user is a stored contact of the user. The status notification may be provided to the additional user only if the additional user is a stored contact of the user. In some additional or alternative implementations, the status notification that is provided to the additional user may be based on whether the additional user satisfies the trust criterion. For example, assume the trust criterion is that the additional user is a stored frequent contact of the user (e.g., a contact interacted with by the user with at least a threshold frequency). A status notification that includes a particular status and a predicted duration may be provided to the additional user if the additional is a stored frequent contact of the user, whereas an alternative "more generic" status notification may be provided if the additional user is not a frequent contact. For instance, the more generic status notification may omit the predicted duration and/or include a generic status such as "busy" (that does not identify a particular activity) in lieu of the particular status (e.g., a particular status of "at the gym" that identifies a particular location of "the gym" and infers a particular activity of "working out"). One or more additional and/or alternative trust criteria may be utilized, such as the user explicitly indicating the "trust level" of the additional user, whether the user has explicitly chosen to share detailed status notifications with the additional user in the past, whether the user has explicitly chosen to share detailed status notification with similar user(s) in the past, etc.

Some implementations of this specification are additionally or alternatively directed to training a machine learning model to enable determining, over the machine learning model, a status of a user and/or a predicted duration of that status. Some implementations are additionally or alternatively directed to use of such a trained machine learning model to determine a status of a user and/or a predicted duration of that status. In some of those implementations, the trained machine learning model is resident on a client device of a user and can be used to determine a status and/or predicted duration of the status without necessitating the client device transmit certain data (e.g., sensor-based data) to one or more remote computing devices. This may enable determination of a status and/or predicted duration without necessitating that certain sensitive data be transmitted over one or more external networks (e.g., the Internet). Detailed additional description of various implementations of training and using a machine learning model is provided herein.

Status notifications can be utilized in various scenarios. As one example, a status notification can be utilized as a current status of a user in a chat messaging system, social networking system, and/or other electronic communication system. The current status can be displayed to contacts and/or other users of the system to provide them with an indication of the current status of the user. Accordingly, prior to sending the user an electronic communication, the other user(s) may be presented with the status notification. As described above, in some implementations the status notification may be tailored to the other user(s) based on one or more trust criteria and/or provided to the other user(s) based on one or more trust criteria. When the status notification of a user is used in a messaging system, a client computing device of the user may generate and/or transmit the status notification (e.g., directly to client device(s) of other user(s) and/or to electronic communications server(s)), and/or electronic communications server(s) may generate and/or transmit the status notification.

As another example, a status notification of a user may be provided to a client device of another user in response to an electronic communication being sent to the user from the other user. In some of those examples, the status notification may only be provided responsively. In other words, the status notification may not be proactively provided in advance of receiving an electronic communication or other electronic transmission. For instance, the status notification can be provided as an "auto-reply" chat message in response to a received chat message, or an "auto-reply" short message service (SMS) message in response to a received SMS message. Also, for instance, the status notification can be provided audibly in response to a phone call or other voice-based electronic communication—or provided audibly in response to a non-voice based electronic communication. When the status notification of a user is provided in response to a received electronic transmission, a client computing device of the user may generate and/or transmit the status notification (e.g., directly to client device(s) of other user(s) and/or to electronic communications server(s)), and/or electronic communications server(s) may generate and/or transmit the status notification.

In some implementations, a method performed by one or more processors is provided that includes receiving data for a user that includes sensor-based data that is generated based on output from one or more sensors of one or more electronic devices of the user. The method further includes determining, based on the data, a status of the user and a predicted duration of the status of the user. The method further includes generating a status notification that indicates the status and that indicates the predicted duration of the status, and transmitting the status notification over a network interface. Transmitting the status notification over the network interface causes presentation of the status notification to an additional user via a computing device of the additional user.

These and other implementations may optionally include one or more of the following features.

In some implementations, determining the predicted duration includes determining the predicted duration independent of any direct data that directly indicates the duration.

In some implementations, determining the predicted duration comprises determining the predicted duration independent of any calendar entry of the user that directly indicates the duration.

In some implementations, determining the predicted duration is based on indirect data of the data, wherein the indirect data does not directly indicate the duration.

In some implementations, determining the predicted duration includes: applying the data as input to a machine learning model; generating output over the machine learning model based on the input; and determining the predicted duration based on the output generated over the machine learning model. In some of those implementations, determining the status based on the data includes determining the status based on the output generated over the machine learning model. Determining the predicted duration based on the output generated over the machine learning model may include determining the predicted duration based on a stored association of the status to the predicted duration. The predicted duration may be particularized to the user. In some of the implementations where the predicted duration is determined based on the output generated over the machine learning model, the predicted duration is indicated directly by the output generated over the machine learning model. In some of those implementations, the data applied as input to the machine learning model includes historical data that indicates historical duration, for the user, for one or more activities.

In some implementations, transmitting the status notification over the network interface includes: transmitting the status notification to at least one electronic communications server managing an electronic communications system to cause the electronic communications server to update a current status of the user in the messaging system based on the status notification. The updated current status is transmitted by the electronic communications server to the computing device of the additional user to present the current status to the additional user via the computing device.

In some implementations, the method further includes receiving an electronic communication sent to the user by the additional user, and transmitting the status notification over the network interface is in response to receiving the electronic communication. In some versions of those implementations, transmitting the status notification includes: transmitting the status notification as part of a responsive electronic communication that is responsive to the received electronic communication and that is directed to the additional user.

In some implementations, transmitting the status notification over the network interface includes transmitting the status notification as an audio signal for audible presentation to the additional user.

In some implementations, a method performed by one or more processors of a client device of a user is provided that includes receiving data for a user that includes sensor-based data generated based on output from one or more sensors. The sensors are of the client device or an additional electronic device in network communication with the client device. The method further includes: applying the data as input to a machine learning model stored locally on the client device; generating output over the machine learning model based on the input; and determining, based on the output generated over the machine learning model, a status of the user and a predicted duration of the status of the user. The method further includes transmitting, via a network interface of the client device, the status and the predicted duration to one or more additional electronic devices over a network.

These and other implementations may optionally include one or more of the following features.

In some implementations, the status is indicated directly by the output generated over the machine learning model. In some of those implementations, determining the predicted duration based on the output generated over the machine learning model includes: determining the predicted duration based on a stored association of the status to the predicted duration.

In some implementations, the predicted duration is indicated directly by the output generated over the machine learning model. In some of those implementations, the data applied as input to the machine learning model includes historical data that indicates historical duration of the user for one or more activities.

In some implementations, a method performed by one or more processors is provided that includes receiving data for a user and determining a particular activity engaged in by the user based on the data. The method further includes, in response to determining that a first user satisfies one or more trust criteria with respect to the user, transmitting, to a first computing device of the first user: a first status notification that identifies the particular activity. The method further includes, in response to determining that a second user fails to satisfy one or more of the one or more trust criteria with respect to the user: transmitting, to a second computing device of the second user: a second status notification that does not identify the particular activity.

These and other implementations may optionally include one or more of the following features.

In some implementations, the method further includes determining a predicted duration of the particular activity based on the data. In some of those implementations, the first status notification further includes the predicted duration based on determining that the first user satisfies the one or more trust criteria. In some of those implementations, the second status notification the second status notification omits the predicted duration based on determining that the second user fails to satisfy one or more of the one or more trust criteria.

In some implementations, a method performed by one or more processors is provided that includes receiving data for a user and determining, based on the data, a predicted duration of an activity engaged in by the user. The method further includes, in response to determining that a first user satisfies one or more trust criteria with respect to the user, transmitting, to a first computing device of the first user: a first status notification that identifies the predicted duration. The method further includes, in response to determining that a second user fails to satisfy one or more of the one or more trust criteria with respect to the user: transmitting, to a second computing device of the second user: a second status notification that does not identify the predicted duration.

In addition, some implementations include one or more processors of one or more computing devices, where the one or more processors are operable to execute instructions stored in associated memory, and where the instructions are configured to cause performance of any of the aforementioned methods. Some implementations include at least one non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
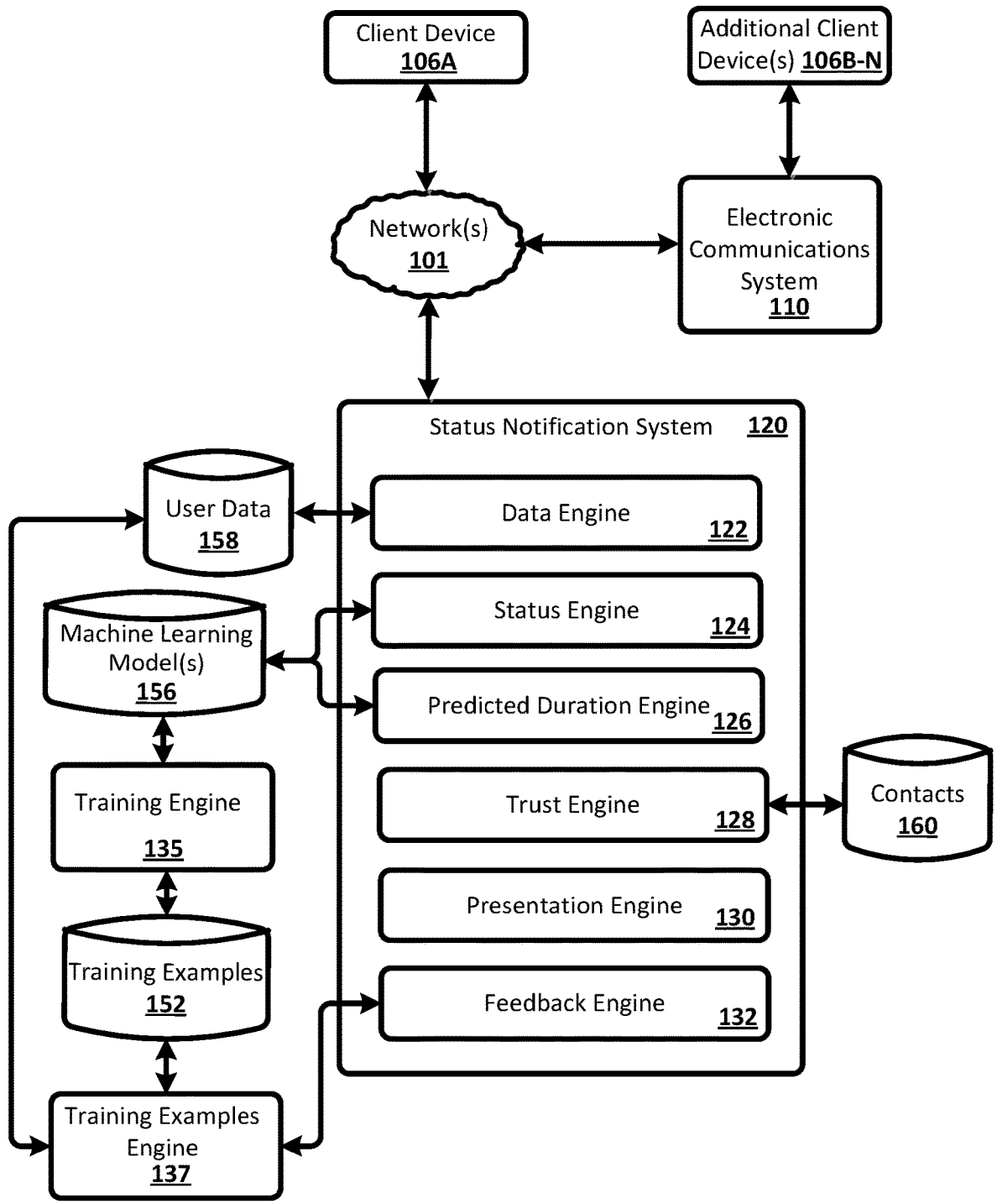
FIG. 1 is a diagram of an example environment in which implementations disclosed herein may be implemented.

In FIG. 1, an example environment in which techniques disclosed herein may be implemented is illustrated. The example environment includes a communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques.

The example environment also includes a client device 106A, additional client device(s) 106B-N, electronic communications system 110, status notification system 120, training engine 135, and training examples engine 137. The example environment further includes user data 158, contacts 160, training examples 152, and machine learning model(s) 156. The user data 158, contacts 160, training examples 152, and machine learning model(s) 156 may each be stored in one or more corresponding computer readable media.

Some non-limiting examples of client device(s) 106A-N include one or more of: a desktop computing device, a laptop computing device, a tablet computing device, a mobile phone computing device, a computing device of a vehicle (e.g., an in-vehicle communications system, an in-vehicle entertainment system, an in-vehicle navigation system), or a wearable apparatus that includes a computing device (e.g., a watch having a computing device, glasses of having a computing device, a virtual or augmented reality computing device). Additional and/or alternative client devices may be provided. For various examples herein, client device 106A will be assumed to be a client device of a first user, client device 106B a client device of a second user, client device 106C a client device of a third user, etc. However, it is understood that status notification system 120 may interface with each of a plurality of client devices and/or other electronic devices of a given user that form a coordinated "ecosystem" of client devices of the given user. For example, as described herein, user data 158 utilized by the status notification system 120 may include sensor-based data and/or other data based on client device 106A, as well as other data that is based on other electronic devices of a user of the client device 106A. However, for the sake of brevity, some examples described in this disclosure will focus on a single client device of a corresponding user.

Electronic communications system 110, status notification system 120, and/or engines 135 and/or 137 may each be implemented in one or more computing devices that communicate, for example, through a network (e.g., network 101 and/or other network). Electronic communications system 110, status notification system 120, and engines 135 and 137 are example components via which the systems and techniques described herein may be implemented and/or with which systems and techniques described herein may interface. They may each include one or more memories for storage of data and software applications, one or more processors for accessing data and executing applications, and other components that facilitate communication over a network. In some implementations, electronic communications system 110, status notification system 120, and/or engines 135 and/or 137 may include one or more components of the example computing device of FIG. 6. The operations performed by electronic communications system 110, status notification system 120, and/or engines 135 and/or 137 may be distributed across multiple computer systems.

In some implementations, one or more aspects of one or more of electronic communications system 110, status notification system 120, and/or engines 135 and/or 137 may be combined in a single system and/or one or more aspects may be implemented on the client device 106A and/or one or more of the additional client device(s) 106B-N. For example, the client device 106A may include an instance of one or more aspects of the status notification system 120 and each of the additional client device(s) 106B-N may also include an instance of one or more aspects of the status notification system 120. As another example, the client device 106A and each of the additional client device(s) 106B-N may each include an instance of the electronic communications system 110 (e.g., the electronic communications system 110 may be an application installed and executing on each of the devices). As yet another example, one or more aspects of electronic communications system 110 and status notification system 120 may be combined.

The electronic communications system 110 may include one or more remote servers and/or one or more client-side applications associated with the exchange of one or more types of electronic communications between client devices. Types of electronic communications include, for example, emails, rich communication services (RCS) messages, short message service (SMS) messages, multimedia messaging service (MMS) messages, over-the-top (OTT) chat messages, social networking messages, audible communications (e.g., phone calls), audio-video communications, etc. As one example, electronic communications system 110 may include one or more remote servers that manage chat messages between various client devices, and those various client devices may optionally each include a corresponding client-side application. As another examples, electronic communications system 110 may be implemented solely via client-side applications operating on corresponding client devices.

Examples of the status notification system 120 will be described herein with respect to a user of the client device 106A. In some implementations, the status notification system 120 may be implemented, in whole or in part, on the client device 106A. In some implementations, one or more of the components of the status notification system 120 may additionally or alternatively be implemented on one or more servers that are remote from the client device 106A. For example, one or more components may be implemented on a remote server of the electronic communications system 110. Although examples are described with respect to a user of the client device 106A, it is understood that the status notification system 120 (or an additional instance thereof) may generate and/or transmit status notifications for users of other client devices (e.g., additional users of additional client devices 106B-N). In generating a status notification for an additional user, the status notification system 120 will rely on user data that is specific to that additional user, and may optionally utilize one or more machine learning model(s) 156 that are specific to that additional user.

In various implementations, status notification system 120 may include a data engine 122, a status engine 124, a predicted duration engine 126, a trust engine 128, a presentation engine 130, and/or a feedback engine 132. In some implementations, aspects of engines 122, 124, 126, 128, 130, and/or 132 may be omitted, combined, and/or implemented in a component that is separate from status notification system 120.

The data engine 122 selects user data 158 for use in determining a status and/or predicted duration of a user. In some implementations, the user data 158 includes sensor-based data that is generated based on output from sensors of the client device 106A and/or other electronic device(s) of the user. In some implementations, the user data 158 additionally or alternatively includes computer-based action data that is generated based on user activities via the client device 106A and/or other electronic device(s) of the user. In some implementations, the user data 158 additionally or alternatively includes historical data that indicates measured past durations of status(es) of the user. As described herein, the user of the client device 106A may be provided with an opportunity to control whether and/or which user data 158 is accessible to the data engine 122 and/or other components of the status notification system 120.

Sensor-based data may be generated based on, for example, output from a global position system (GPS) sensor, an accelerometer, a microphone, a camera, a gyroscope, and/or other sensor(s). Sensor-based data may include raw sensor data (e.g., output as received from the sensor) and/or may include generalized sensor data that is determined based on output from one or more sensors. For example, the sensor-based data may include the raw audio data from a microphone and/or may include generalization(s) of the raw audio data. The generalization(s) of the raw audio data may include, for example, an average (and/or other statistical measure) decibel level over a time period, classification(s) of the raw audio data based on applying the data to a classifier (e.g., classification(s) such as "noisy", "quiet", "music", etc.), etc. As another example, the sensor-based data may additionally or alternatively include raw GPS data and/or may include generalization(s) of the GPS data. The generalization(s) of the GPS data may include, for example, a classification of a location indicated by the GPS data (e.g., restaurant, cinema, workout facility), a particular location indicated by the GPS data (e.g., Restaurant A, Cinema A), etc. As yet another example, the sensor-based data may additionally or alternatively include raw accelerometer data and/or generalization(s) of such data. The generalization(s) of the raw accelerometer data may include an average (and/or other statistical measure) speed based on the data from the accelerometer, classification(s) of activity based on applying the data to a classifier (e.g., classification(s) such as "running", "walking", "stagnant"), etc.

Computer-based action data that is generated based on user activities via the client device 106A and/or other electronic device(s) of the user may include, for example: calendar entries and/or other electronic documents created via the device(s); document(s) interacted with (e.g., visited) via the device(s); application(s) currently or recently utilized via the device(s); state(s) of application(s) currently or recently utilized via the device(s); average (or other statistical measure) processing power consumed over a recent time period; etc. For example, the computer-based action data may indicate whether the user is currently engaged in a phone call via the client device 106A; feature(s) of an active phone call, if any (e.g., dialed or received, who with); whether the user is currently engaged in a video-conference via the client device 106A; etc.

As some examples of historical data, the historical data may indicate average (or other statistical measure) duration of past received phone calls, average (or other statistical measure) duration of past initiated/dialed phone calls, average (or other statistical measure) duration of past received and initiated phone calls of the user, etc. As another example of historical data, the historical data may indicate average (or other statistical measure) duration of meetings (in general and/or for each of a plurality of specific types of meetings (e.g., based on other attendees of the meetings)), average (or other statistical measure) duration of shopping trips (in general and/or for each of a plurality of specific types of shopping trips), average (or other statistical measure) duration of workouts, etc. Average durations of a status may be based on, for example, past calendar entries of the user that indicate that status and/or past durations of that status as indicated by sensor-based and/or computer-based action data of the user (e.g., past duration(s) of that status as indicated by machine learning model(s) 156).

In some implementations, the data engine 122 selects at least some of the data based on it satisfying a corresponding timeliness criterion and/or satisfying one or more other criteria. For example, the data engine 122 may select any GPS-based data that is based on output from a GPS sensor within the last 20 seconds, may select audio-based data that is based on output from a microphone within the last 15 seconds, may select application data based on it being "current", may select calendar-based data based on it being stored in association with a current time, etc. In some implementations, the data engine 122 is resident on the client device 106A and receives at least some of the data directly from corresponding sensor(s), application(s), intermediary component(s), and/or other component of the client device 106A.

The status engine 124 utilizes the data selected by the data engine 122 to determine a current status of the user. The particular status determined by the status engine 124 will be dependent on the data. For example, for some data the determined status may be "available", for other data the determined status may be "dining", for other data the determined status may be "working out", etc. The status engine 124 may receive "fresh" data from the data engine 122 continuously, periodically, or at other regular and/or non-regular intervals to enable dynamic determination and adaptation of the status of a user. In some implementations, the status engine 124 applies the data as input to one or more of the machine learning model(s) 156, generates output over those machine learning model(s) 156 based on the input, and determines the status based on the generated output.

The predicted duration engine 126 utilizes the data selected by the data engine 122 to determine a predicted duration of the current status of the user. In some implementations, the predicted duration engine 126 and the status engine 124 utilize the same data in determining the status and in determining the predicted duration. In some of those implementations, one or more of the machine learning model(s) 156 may be trained to provide output that directly indicates both the status of the user, and the expected duration of that status. For example, the data may be applied as input to one of the machine learning model(s) 156, output generated over that machine learning model based on the input, and the output may directly indicate both the status and the predicted duration of the status.

In some implementations, the predicted duration engine 126 and the status engine 124 utilize different data in determining the status and in determining the predicted duration. For example, the data utilized by the predicted duration engine 126 may include at least some data that is not utilized by the status engine 124 and/or may omit at least some data that is utilized by the status engine 124. For instance, the predicted duration engine 126 may utilize the status determined by the status engine 124 and historical data and/or other data, in determining the predicted duration. The status determined by the status engine 124 is not utilized by the status engine 124, and the historical data and/or other data may have optionally also not been utilized by the status engine 124. In some implementations, the predicted duration engine 126 may optionally utilize a knowledge graph or other entity database in determining a predicted duration. For example, if the status engine determines the status is "at a movie", and data indicates the user is at "Movie A", the predicted duration engine 126 may utilize a runtime of "Movie A" in determining the predicted duration of "at a movie" for the user. The runtime may be indicated in, for example, an entity database. As another example, if the status engine 124 determines the status is "dining", and sensor-based data indicates the user is at "Restaurant X", the predicted duration engine 126 may utilize a historical residence time for "Restaurant X" in determining the predicted duration of "dining" for the user. The historical residence time for "Restaurant X" may be indicated in an entity database and may be based on, for example, the residence times of a population of users at "Restaurant X".

In some implementations and/or for some statuses, the trust engine 128 utilizes at least one trust criterion in determining whether to provide a status notification of a user to a particular additional user and/or in determining what status notification to provide to the additional user. In some of those implementations, the trust engine 128 may determine a status notification should be provided to a particular additional user only if the particular additional user satisfies one or more trust criteria. The trust engine 128 may determine whether a given additional user satisfies a trust criterion with reference to one or more resources, such as contacts 160. Contacts 160 may store contacts of a user, as well as various features for each of the stored contacts such as: frequency of interaction with the contact by the user, whether the user has labeled the contact as a "trusted" contact, whether the user has explicitly shared status information with the user in the past, etc.

As one example, assume the trust criterion is that the additional user is a contact of the user that the user has explicitly indicated should receive status notifications. The trust engine 128 may determine that status notification may be provided to the additional user only if the user has explicitly indicated that additional user should receive status notifications. In some additional or alternative implementations, the trust engine 128 may determine the status notification that is provided to the additional user based on whether the additional user satisfies one or more trust criteria. For example, assume the trust criterion is that the additional user is a stored frequent contact of the user (e.g., a contact interacted with by the user with at least a threshold frequency—as indicated by data of contacts 160). The trust engine 128 may determine that a status notification that includes a particular status and a predicted duration may be provided to the additional user if the additional user is a stored frequent contact of the user, whereas an alternative "more generic" status notification should be provided if the additional user is not a frequent contact.

The presentation engine 130 transmits status notification(s) to one or more of the additional client device(s) 106B-N and/or to the electronic communications system 110 (which, in turn, may transmit the status to one or more of the additional client devices 106B-N). The presentation engine 130 transmits the status notification(s) for visible and/or audible presentation to additional user(s) via corresponding additional client devices 106B-N. As described herein, in some implementations the status notification transmitted for presentation to a particular additional user may be tailored to that additional user based on one or more trust criteria and/or transmitted for presentation to that additional user based on one or more trust criteria.

In some implementations, the presentation engine 130 transmits the status notification for utilization as a current status of the user by the electronic communications system 110. The current status can then be provided, by the electronic communications system 110, as a current status for display to contacts and/or other users of the system to provide them with an indication of the current status of the user. For example, the electronic communications system 110 may cause corresponding electronic communication clients of the additional client devices 106B-N to display the status notification in a graphical user interface rendered by the electronic communication clients.

In some implementations, the presentation engine 130 transmits a status notification to a client device of another user in response to an electronic communication being sent to the user from the other user. In some of those implementations, the status notification may only be provided responsively. For instance, the status notification can be provided as an "auto-reply" chat message in response to a received chat message. Also, for instance, the status notification can be provided audibly in response to a phone call or other voice-based electronic communication—or provided audibly in response to a non-voice based electronic communication.

In some implementations, a status notification is generated and transmitted for presentation to additional users independent of one or more user interface inputs provided by the user. In other words, the status notification system 120 may generate and transmit the status notification automatically without requiring explicit authorization from the user of the client device 106A. In some other implementations, the status notification may be generated automatically, but only transmitted for providing to one or more additional user(s) in response to affirmative user interface input of the user via the client device 106A, such as a user selection of a user interface element, a spoken command provided by the user, etc. For example, the status notification may be presented to the user, via the client device 106A, as a suggested response to a received message, and only transmitted in response to the received message based on affirmative user interface input directed toward the suggested response.

In some implementations, whether and/or how the presentation engine 130 provides a status notification may be based on a confidence score for status determined by the status engine 124. For example, the presentation engine 130 may automatically provide the status notification for presentation if the confidence score satisfies a threshold, but may require user interface input before providing the suggestion if the confidence score does not satisfy the threshold. The confidence score may be indicated, for example, by the output provided by one or more of the machine learning model(s) 156 in determining the status.

The feedback engine 132 may use solicited and/or non-solicited feedback of the user of the client device 106A to provide to training examples engine 137. The training examples engine 137 may utilize the feedback in generating further training examples for refining one or more of the machine learning model(s) 156. As one example, assume the user of the client device manually changes an automatically determined predicted duration of "30 minutes" to "45 minutes". The feedback engine 132 may provide, to the training examples engine 137, the changed-to duration of "45 minutes", along with data utilize to determine the predicted duration of "30 minutes". The training examples engine 137 may then utilize the data to generate training example input of a training example, and may generate training example output of the training example based on the changed-to duration of "45 minutes". As another example, assume the user of the client device manually changes an automatically determined status of "available" to "sleeping". The feedback engine 132 may provide, to the training examples engine 137, the changed-to status of "sleeping", along with data utilize to determine the status of "available". The training examples engine 137 may then utilize the data to generate training example input of a training example, and may generate training example output of the training example based on the changed-to status of "sleeping".

Turning now to FIGS. 2A-2D, additional description is provided of various components of FIG. 1.

Figure 2A:
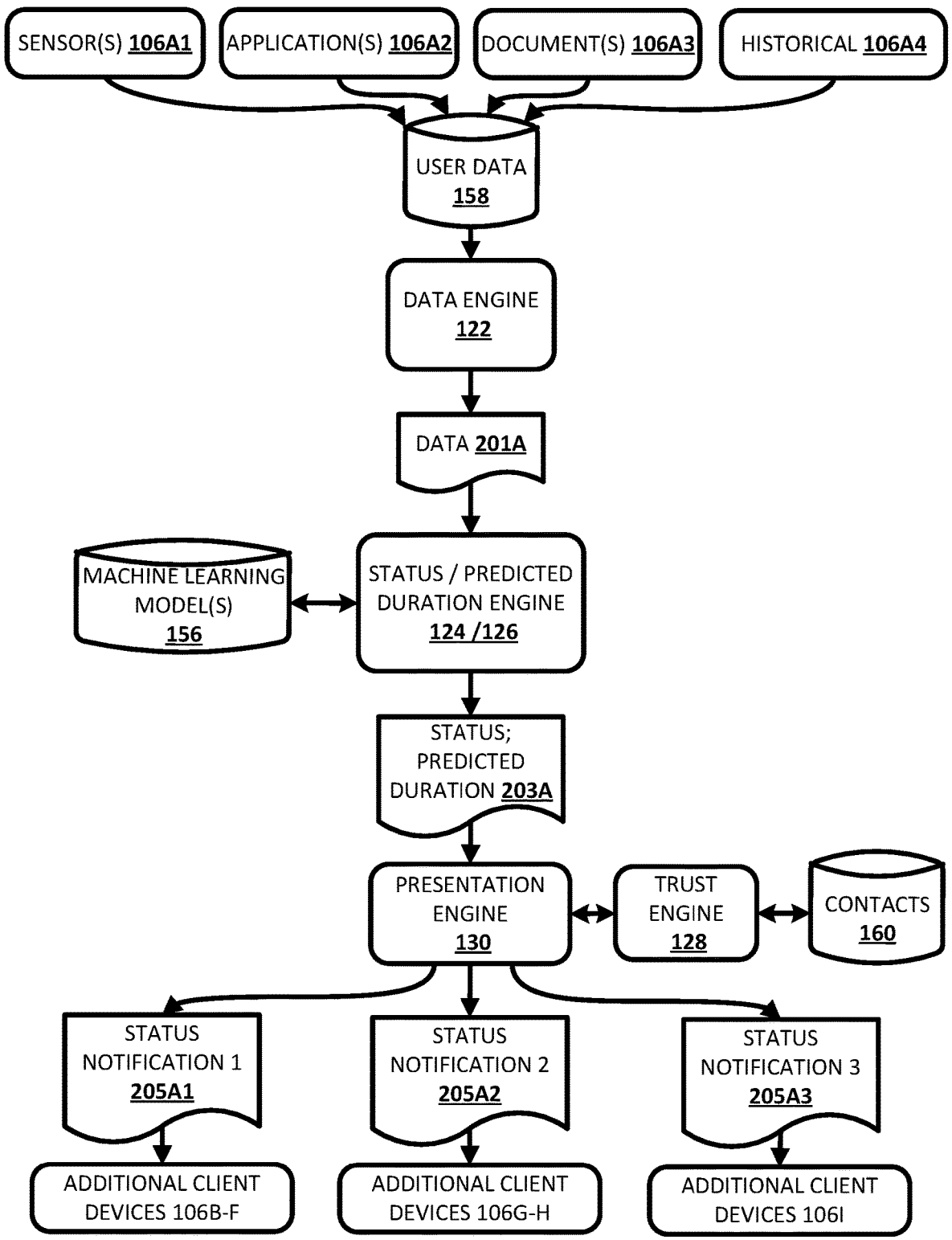
FIG. 2A illustrates an example of using components of the example environment of FIG. 1 in generating status notifications of a user and transmitting the status notifications to additional client devices of additional users.

FIG. 2A illustrates an example of using components of the example environment of FIG. 1 in generating status notifications of a user and transmitting the status notifications to additional client devices of additional users. In FIG. 2A, user data 158 is generated based on output from sensors 106A1 of the client device 106A, states and/or other data from applications 106A2 of the client device 106A, documents 106A3 created and/or accessed via the client device 106A, and historical data 106A4 that indicates historical duration, for the user, for one or more activities. The output from the sensor(s) 106A1 is used to generate sensor-based data of the user data 158, the output from the application(s) 106A2 and the document(s) 106A3 are used to generate computer-based action data of the user data 158, and the historical data 106A4 is used to create historical data of the user data 158. In some implementations, the user data 158 may be generated based on output generated by sensors of, and/or user actions via, additional or alternative electronic devices of the user (e.g., sensors of a watch of the user that is in electronic communication with the client device 106A).

The data engine 122 selects, from the user data 158, a subset of data 201A for providing to the status engine 124 and predicted duration engine 126. In FIG. 2A, the status engine 124 and predicted duration engine 126 are illustrated as one component, as they utilize the same one or more machine learning model(s) 156 to generate output indicative of both the status and the predicted duration. For example, the engines 124 and 126 may apply the data 201A as input to one of the machine learning models 156 and generate output over the machine learning model based on the applied input. The generated output directly indicates both the status and the predicted duration, and the engines 124 and 126 provide the status and predicted duration 203A to the presentation engine 130. As one example, the input applied to the machine learning model may be a vector of values that are based on the data 201A and that include values based on sensor-based data, computer-based action data, and historical data. The output may indicate, for each of a plurality of different statuses, a likelihood/confidence score that the status is indicated based on the applied data and may indicate a value that indicates a predicted duration of the status. The status may be selected based on the status with the highest indicated likelihood of the output, and the predicted duration selected based on the indicated predicted duration of the output.

The presentation engine 130 works with the trust engine 128 to determine which status notification (if any) to provide to which contacts. As described herein, the trust engine 128 may utilize contacts 160 and/or other resource(s) in determining whether an additional user should be provided with a status notification and/or the contents of any provided status notification.

In the example of FIG. 2A, the presentation engine 130 provides a first status notification 205A1 to a first group of additional users via transmission to corresponding additional client devices 106B-F. The presentation engine 130 further provides a second status notification 205A2 to a second group of additional users via transmission to corresponding additional client devices 106G-H. The presentation engine 130 further provides a third status notification 205A3 to a third group of one additional user via transmission to a corresponding additional client devices 106I. For example, the first status notification 205A1 may indicate a particular status and a particular anticipated duration (e.g., "Working out. Done in about 45 minutes") and may be provided to the additional client devices 106B—F based on the trust engine 128 determining that corresponding contacts 160 satisfy each of a plurality of trust criteria. The second status notification 205A2 may indicate a generic status and a particular anticipated duration (e.g., "Busy. Available again in about 45 minutes") and may be provided to the additional client devices 106G-H based on the trust engine 128 determining that corresponding contacts 160 satisfy some, but not all of, the trust criteria. The third status notification 205A3 may indicate a generic status only (e.g., "Unavailable") and may be provided to the additional client device 106I based on the trust engine 128 determining that the corresponding contact of contacts 160 fails to satisfy any of the trust criteria.

In some implementations, the presentation engine 130 transmits the status notifications 205A1-205A3 to corresponding additional client devices directly. In some other implementations, the presentation engine 130 transmits the status notifications 205A1-205A3 to one or more intermediate components (e.g., electronic communications system 110), which then transmit the status notification to the corresponding additional client devices. In some implementations, the presentation engine 130 automatically transmits the status notifications 205A1-205A3. In some other implementations, the presentation engine 130 only transmits the status notifications 205A1-205A3 in response to affirmative user interface input of the user provided via client device 106A. Although FIG. 2A illustrates three separate status notifications being provided to different groups of client devices, in some implementations more or fewer status notifications may be transmitted and/or may be transmitted for presentation to more or fewer additional users.

Figure 2B:
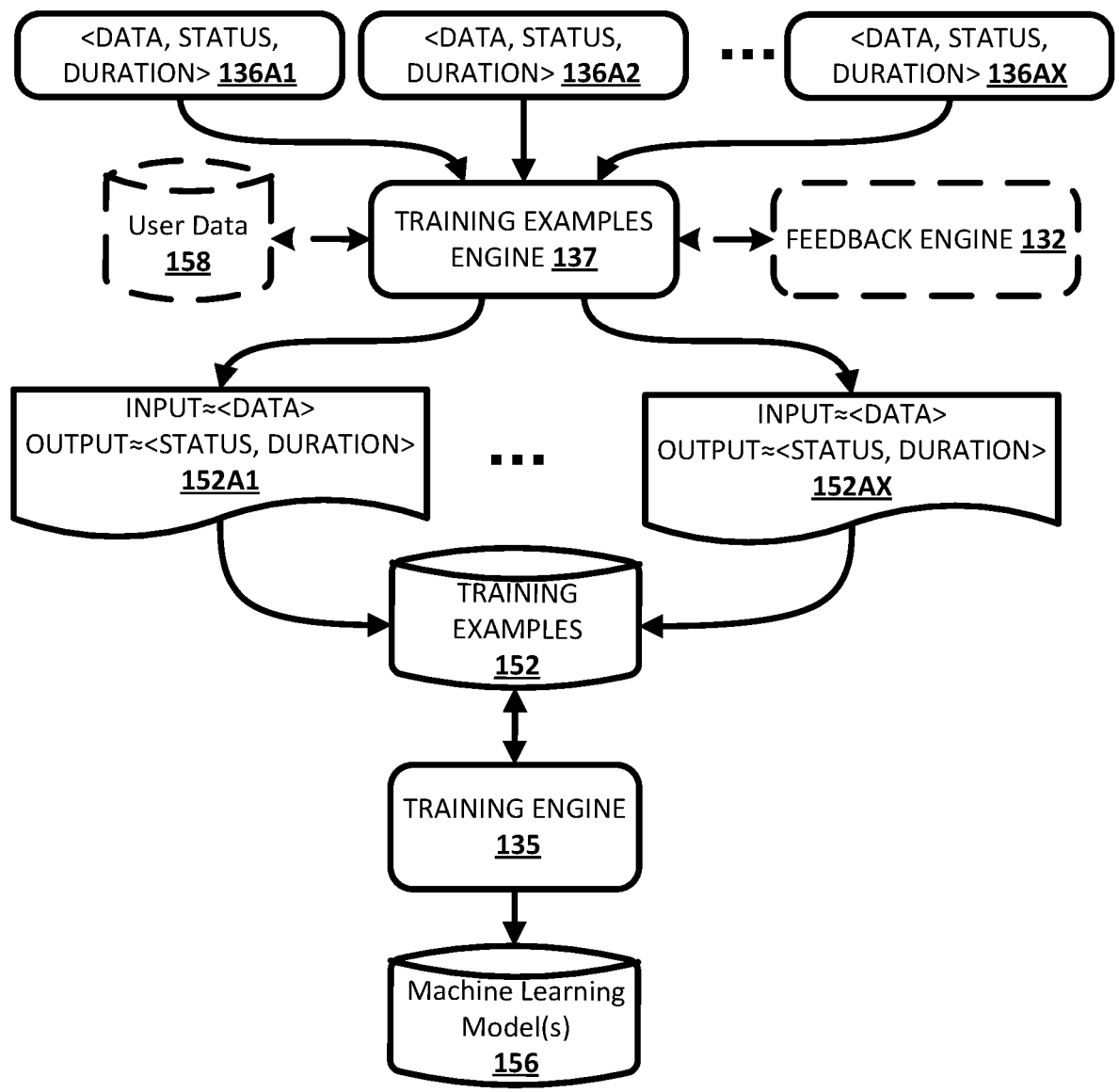
FIG. 2B illustrates an example of using components of the example environment of FIG. 1 in training one or more machine learning models for use, in FIG. 2A, in determining a status of a user and a predicted duration of the status.

FIG. 2B illustrates an example of using components of the example environment of FIG. 1 in training one or more machine learning model(s) 156 for use, in FIG. 2A, in determining a status of a user and a predicted duration of the status.

In FIG. 2B, training data instances 136A1, 136A2, through 136AX are received by the training examples engine 137. Each of the training data instances include corresponding data (e.g., sensor-based data, computing-based action data, historical data), a corresponding status, and a corresponding duration. For example, training data instance 136A1 may include a first vector of data values, a status of "shopping", and a duration of "55 minutes". Also, for example, training data instance 136A2 may include a second vector of data values, a status of "working out", and a duration of "40 minutes". In some implementations, at least some of the training data instances may be generated based on a corresponding user carrying and/or using one or more electronic devices during performance of an activity, and the user annotating the activity and the time period for the activity. The user's annotations may be used as the status and the duration of the training data instances and data generated by the carried and/or used electronic device(s) may be utilized as the data (optionally along with other data). Additional or alternative techniques for generating training data instances may be utilized.

The training examples engine 137 utilizes the training instances to generate training examples 152A1 through 152AX. Each of the training examples includes training example input that is based on the data of a corresponding training data instance, and training example output that indicates that status and the duration of the corresponding training data instance.

The generated training examples are stored as training examples 152 that are utilized by the training engine 135 to train at least one of the machine learning models 156. In some implementations, the training engine 135 trains a machine learning model based on the training examples 152 based on application of the training example input of the training examples and backpropagation based on the training example output of the training examples.

In some implementations, the same trained machine learning model 156 may be utilized for the client device 106A and for other client devices of other users. In some implementations, the trained machine learning model 156 that is utilized for the client device 106A may optionally be further trained based on user data 158 of the user of the client device 106A and/or based on feedback of the user provided by the feedback engine 132. Further training the machine learning model 156 based on user data 158 and/or based on feedback of the user may enable the machine learning model to be further tailored to the user of the client device 106. As one example, past data of the user data 158 may directly indicate a status, a duration, and associated data for a user, and can be utilized by the training examples engine 137 to generate one or more additional training examples for use by the training engine 135. For instance, a calendar entry of the user data 158 may indicate a status and a duration, and corresponding data identified that corresponds to the time period for the status. Examples for using feedback for further training are provided above.

Figure 3A:
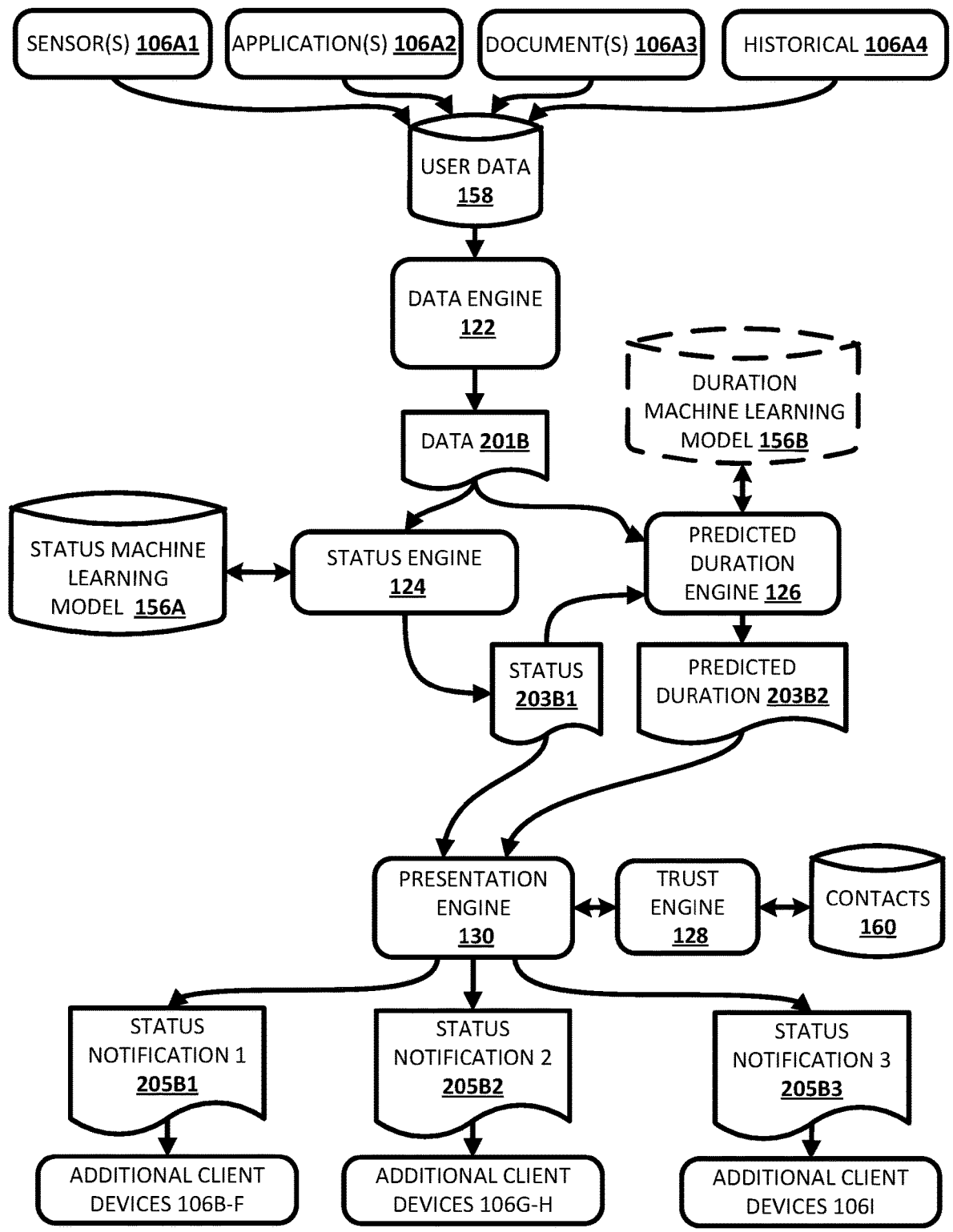
FIG. 3A illustrates another example of using components of the example environment of FIG. 1 in generating status notifications of a user and transmitting the status notifications to additional client devices of additional users.

FIG. 3A illustrates another example of using components of the example environment of FIG. 1 in generating status notifications of a user and transmitting the status notifications to additional client devices of additional users.

As in FIG. 2A, in FIG. 3A user data 158 is generated based on output from sensors 106A1 of the client device 106A, states and/or other data from applications 106A2 of the client device 106A, documents 106A3 created and/or accessed via the client device 106A, and historical data 106A4 that indicates historical duration, for the user, for one or more activities.

The data engine 122 selects, from the user data 158, a subset of data 201B for providing to the status engine 124 and predicted duration engine 126. In FIG. 3A, the status engine 124 and predicted duration engine 126 are illustrated as separate components.

The status engine 124 utilizes the data 201B (all or a subset of the data 201B) to determine a status 203B1. For example, the status engine 124 may determine the status based on applying all or a subset of the data 201B as input to a status machine learning model 156A (of machine learning models 156), that is trained to predict the status (without simultaneously predicting the duration). For instance, the status engine 124 may apply the data 201B as input to the status machine learning model 156A and generate output over the machine learning model based on the applied input. The generated output directly indicates the status, and the status engine 124 provides the status 203B1 to the presentation engine 130 and optionally also to the predicted duration engine 126.

The predicted duration engine 126 utilizes the data 201B (all or a subset of the data 201B), and optionally the status 203B1, to determine a predicted duration 203B2. For example, the predicted duration engine 126 may determine the predicted duration based on applying the status 203B1 and all or a subset of the data 201B as input to a duration machine learning model 156B (of machine learning models 156), that is trained to predict the duration (without simultaneously predicting the status). For instance, the predicted duration engine 126 may apply the status 203B1 and the data 201B as input to the duration machine learning model 156B and generate output over the machine learning model based on the applied input. The generated output directly indicates the predicted duration, and the predicted duration engine 126 provides the predicted duration 203B2 to the presentation engine 130.

In some implementations, the predicted duration engine 126 may determine the predicted duration independent of a separate duration machine learning model 156B. For example, the predicted duration engine 126 may use a stored association of the status 203B1 to the predicted duration. For instance, the stored association may be in one or more databases and may directly indicate a predicted duration for the status 203B1. Other predicted durations for other statuses may likewise be stored in the database(s) and may optionally be particularized to the user of the client device 106A. For example, the database may store an average duration of phone calls for the user, and the average duration utilized if the status 203B1 indicates the particular activity of "phone call". As another example, if the status 203B1 is "dining", the predicted duration engine 126 may use sensor-based data of data 201B to determine the user is at "Restaurant X", and utilize a historical residence time for "Restaurant X", indicated in an entity database, in determining the predicted duration of "dining" (or "dining at Restaurant X") for the user.

As in FIG. 2A, in FIG. 3A the presentation engine 130 works with the trust engine 128 to determine which status notification (if any) to provide to which contacts. In the example of FIG. 3A, the presentation engine 130 provides a first status notification 205B1 to a first group of additional users via transmission to corresponding additional client devices 106B-F. The presentation engine 130 further provides a second status notification 205B2 to a second group of additional users via transmission to corresponding additional client devices 106G-H. The presentation engine 130 further provides a third status notification 205B3 to a third group of an additional user via transmission to a corresponding additional client device 106I.

Figure 3B:
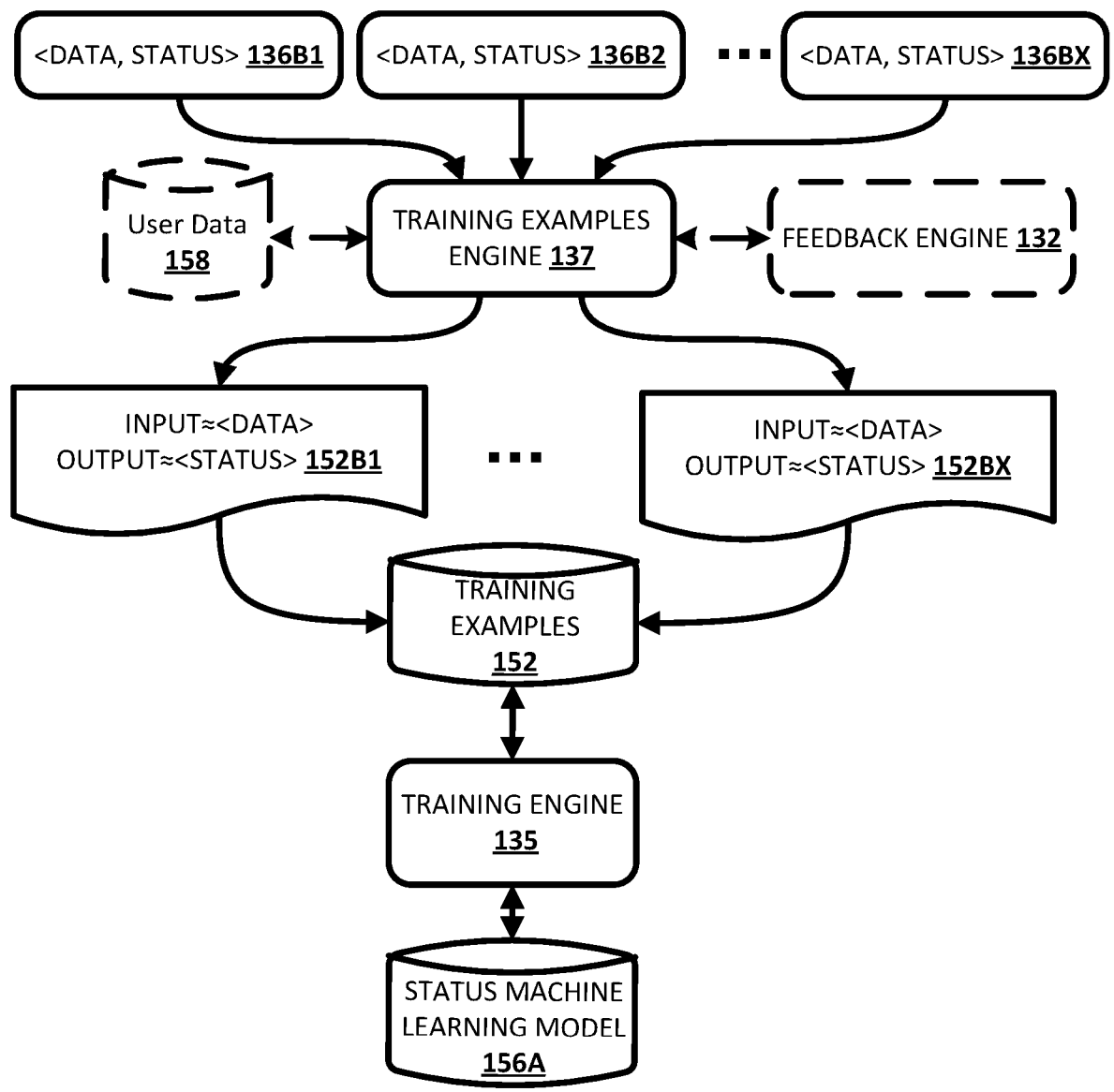
FIG. 3B illustrates an example of using components of the example environment of FIG. 1 in training a status machine learning model for use, in FIG. 3A, in determining a status of a user.

FIG. 3B illustrates an example of using components of the example environment of FIG. 1 in training a status machine learning model 156A for use, in FIG. 3A, in determining a status of a user.

In FIG. 3B, training data instances 136B1, 136B2, through 136BX are received by the training examples engine 137. Each of the training data instances include corresponding data (e.g., sensor-based data, computing-based action data, historical data) and a corresponding status. For example, training data instance 136B1 may include a first vector of data values and a status of "shopping". Also, for example, training data instance 136B2 may include a second vector of data values and a status of "browsing the web". In some implementations, at least some of the training data instances may be generated based on a corresponding user carrying and/or using one or more electronic devices during performance of an activity, and the user annotating the activity. Additional or alternative techniques for generating training data instances may be utilized.

The training examples engine 137 utilizes the training instances to generate training examples 152B1 through 152BX. Each of the training examples includes training example input that is based on the data of a corresponding training data instance, and training example output that indicates that status of the corresponding training data instance.

The generated training examples are stored as training examples 152 that are utilized by the training engine 135 to train the status machine learning model 156A. In some implementations, the training engine 135 trains a machine learning model based on the training examples 152 based on application of the training example input of the training examples and backpropagation based on the training example output of the training examples.

In some implementations, the same trained status machine learning model 156A may be utilized for the client device 106A and for other client devices of other users. In some implementations, the trained status machine learning model 156A that is utilized for the client device 106A may optionally be further trained based on user data 158 of the user of the client device 106A and/or based on feedback of the user provided by the feedback engine 132. As one example, past data of the user data 158 may directly indicate a status and associated data for a user, and can be utilized by the training examples engine 137 to generate one or more additional training examples for use by the training engine 135.

Figure 3C:
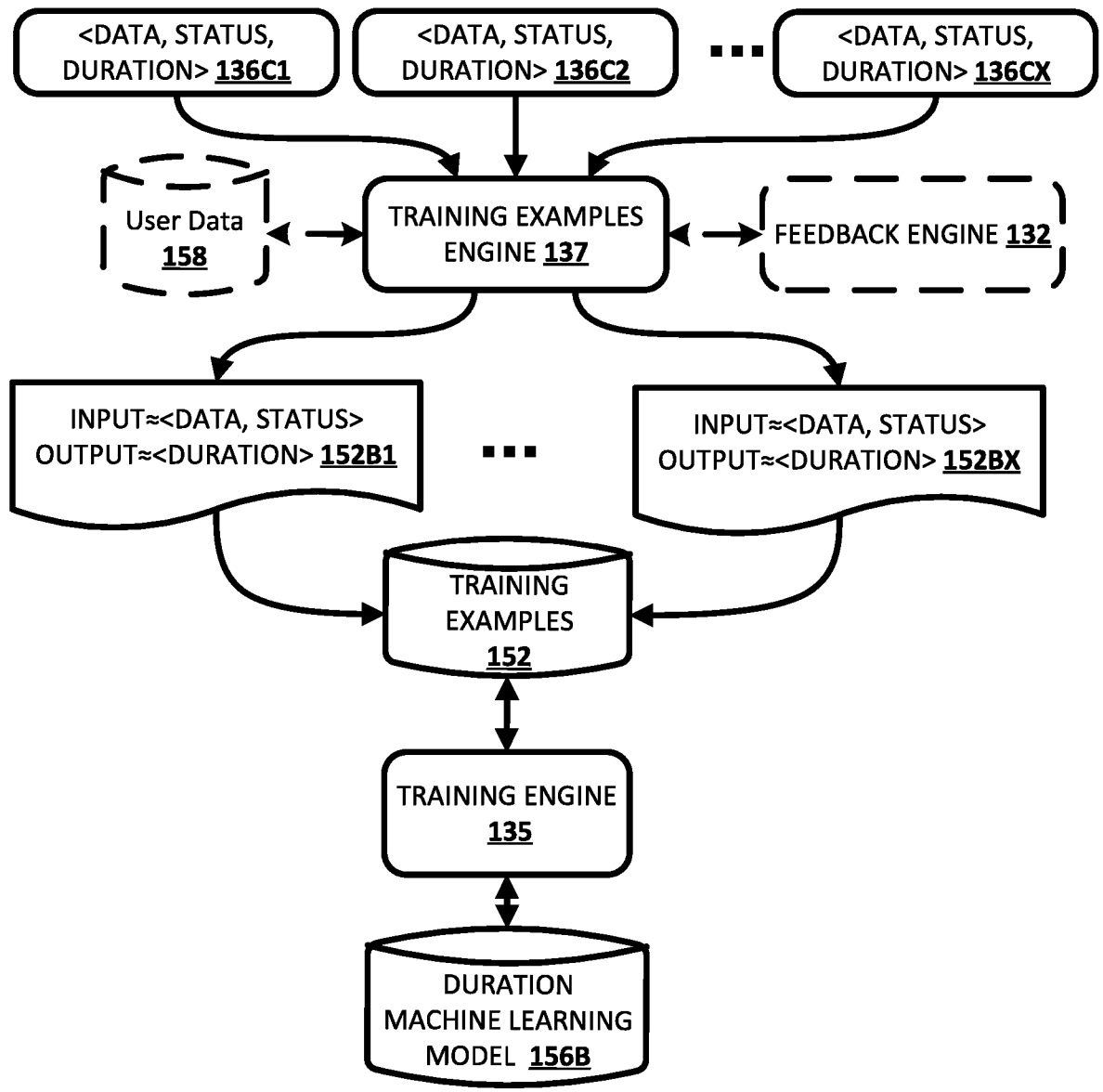
FIG. 3C illustrates an example of using components of the example environment of FIG. 1 in training a duration machine learning model for use, in FIG. 3A, in determining a predicted duration of a status of a user.

FIG. 3C illustrates an example of using components of the example environment of FIG. 1 in training a duration machine learning model 156B for use, in FIG. 3A, in determining a predicted duration of a status of a user.

In FIG. 3C, training data instances 136C1, 136C2, through 136CX are received by the training examples engine 137. Each of the training data instances include corresponding data (e.g., sensor-based data, computing-based action data, historical data), a corresponding status, and a corresponding duration. For example, training data instance 136C1 may include a first vector of data values, a status of "shopping", and a duration of "40 minutes". In some implementations, at least some of the training data instances may be generated based on a corresponding user carrying and/or using one or more electronic devices during performance of an activity, and the user annotating the activity and/or the duration. Additional or alternative techniques for generating training data instances may be utilized.

The training examples engine 137 utilizes the training instances to generate training examples 152C1 through 152CX. Each of the training examples includes training example input that is based on the data and the status of a corresponding training data instance, and training example output that indicates that duration of the corresponding training data instance.

The generated training examples are stored as training examples 152 that are utilized by the training engine 135 to train the duration machine learning model 156B. In some implementations, the training engine 135 trains a machine learning model based on the training examples 152 based on application of the training example input of the training examples and backpropagation based on the training example output of the training examples.

In some implementations, the same duration status machine learning model 156B may be utilized for the client device 106A and for other client devices of other users. In some implementations, the trained duration machine learning model 156B that is utilized for the client device 106A may optionally be further trained based on user data 158 of the user of the client device 106A and/or based on feedback of the user provided by the feedback engine 132. As one example, past data of the user data 158 may be applied to the status machine learning model 156A to determine a status, and a duration of the status determined based on the duration of the status as indicated by application of the past data. The data, determined status, and determined duration can be utilized by the training examples engine 137 to generate one or more additional training examples for use by the training engine 135 in training the duration machine learning model 156B.

Figure 4A:
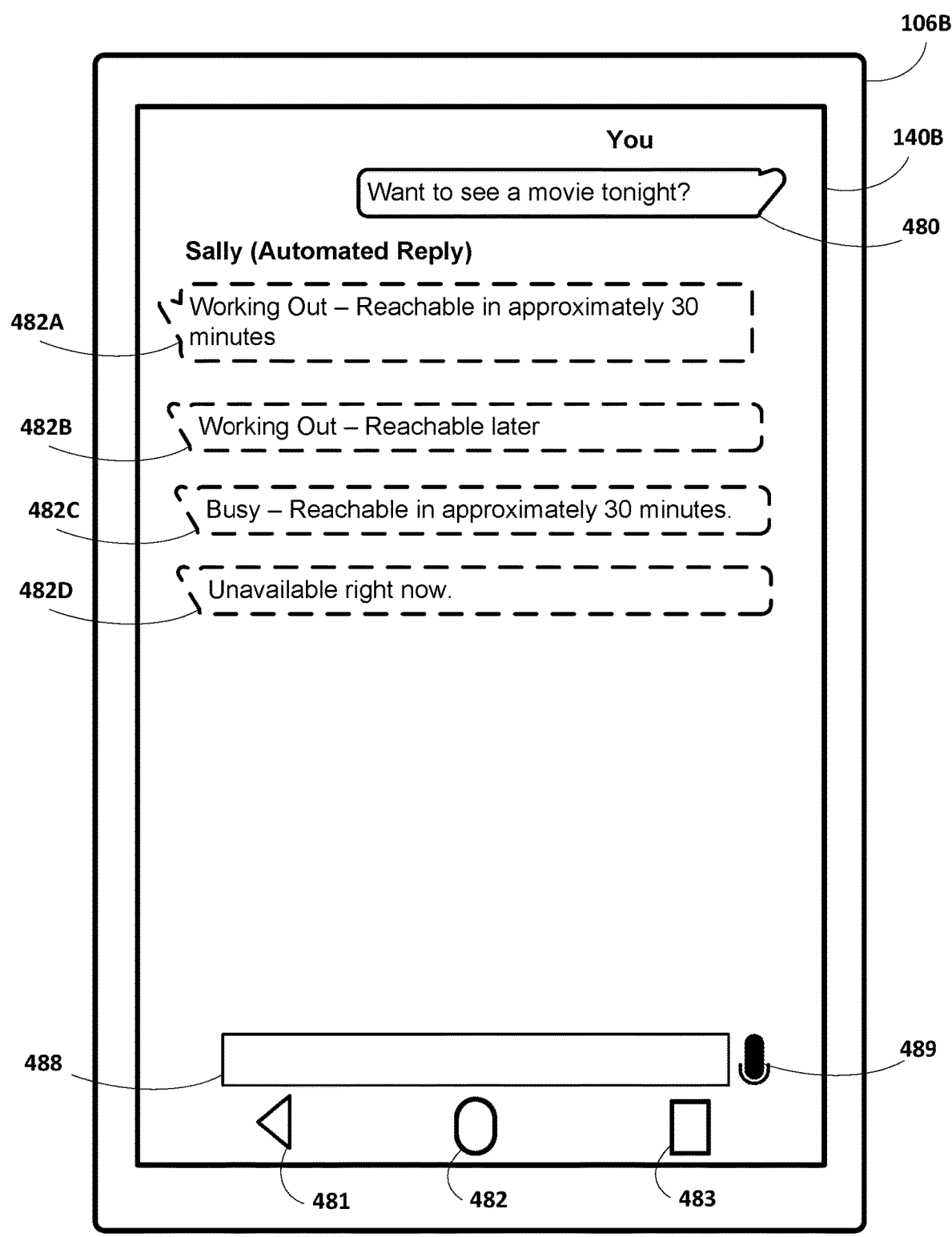
FIGS. 4A, 4B, and 4C each illustrate an example client device and one or more examples of how a status notification of a user may be presented to an additional user of the client device.
Figure 4B:
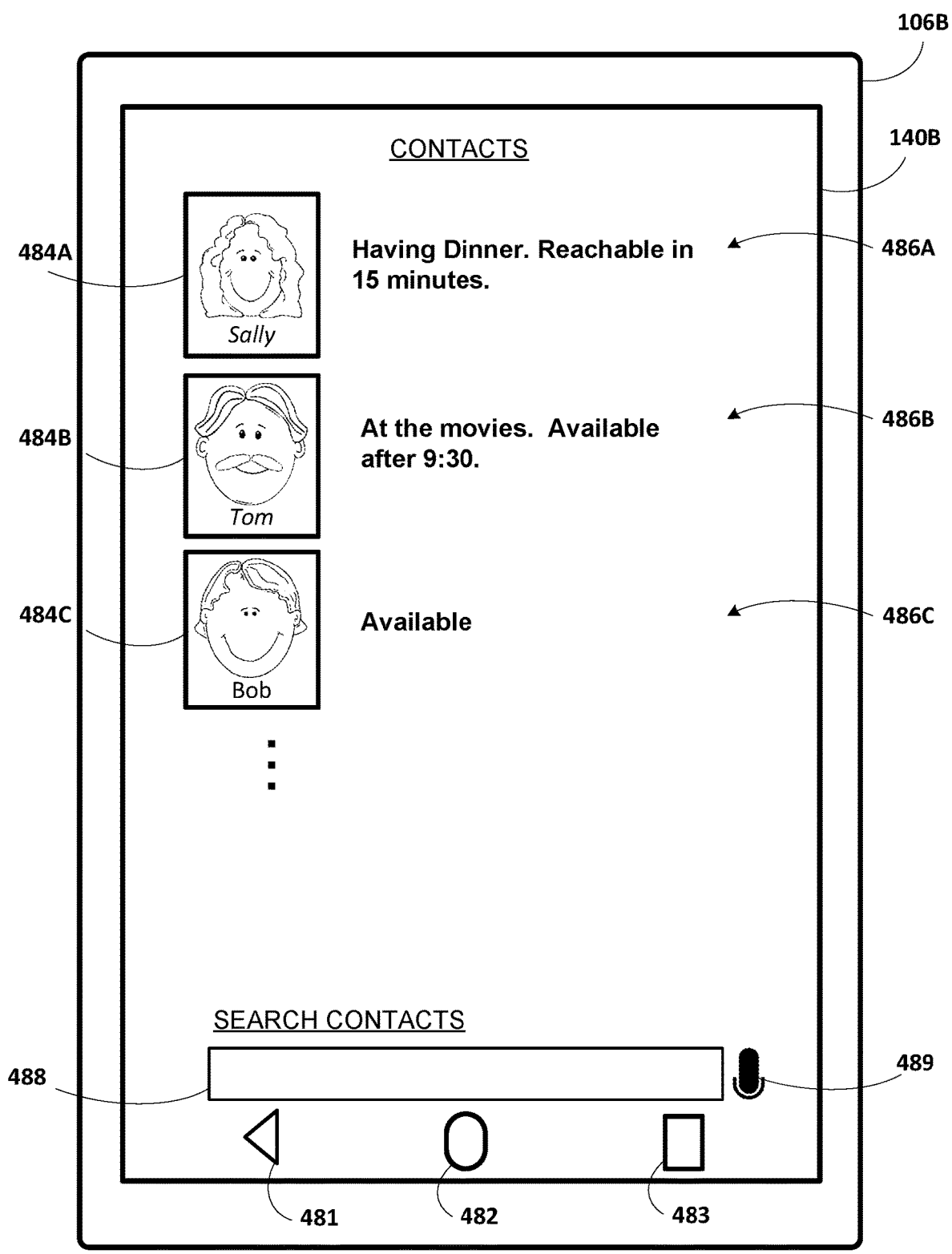
Figure 4C:
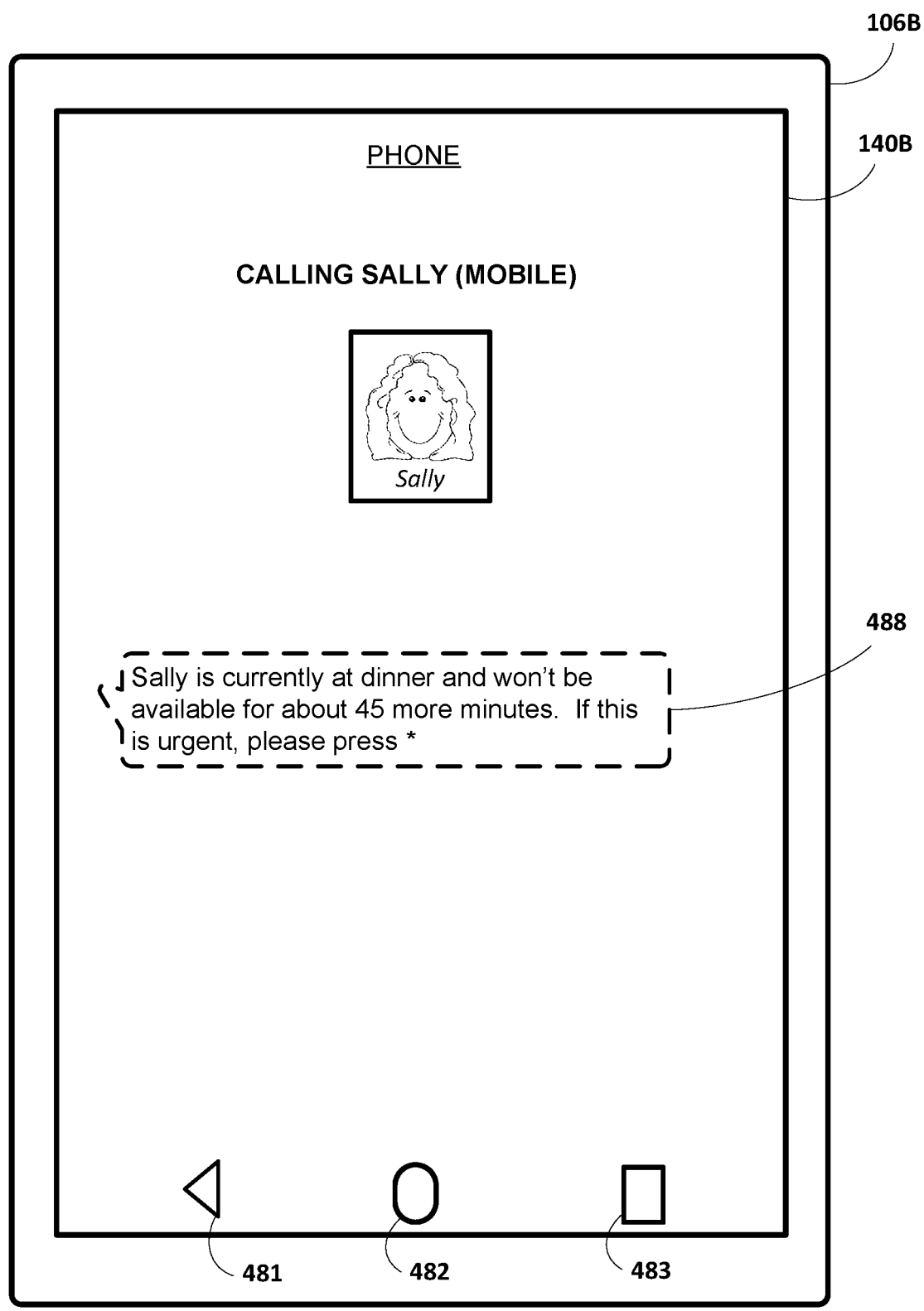

Turning now to FIGS. 4A-4C, additional description is provided of various components and techniques described herein. FIGS. 4A, 4B, and 4C each illustrate the example client device 106B of FIG. 1 and one or more examples of how a status notification of a user (e.g., of client device 106A of FIG. 1) may be presented to an additional user of the client device 106B. The client device 106B of FIGS. 4A-4C includes a display screen 140B. In FIGS. 4A and 4B the display screen 140B includes a reply interface element 488 that the user may select to generate user interface input via a virtual keyboard and a voice reply interface element 489 that the user may select to generate user interface input via a microphone. In some implementations, the user may generate user interface input via the microphone without selection of the voice reply interface element 489. In some of those and/or in other implementations, the voice reply interface element 489 may be omitted. Moreover, in some implementations, the reply interface element 488 may additionally and/or alternatively be omitted (e.g., the user may only provide audible user interface input). The display screen 140B also includes system interface elements 481, 482, 483 that may be interacted with by the user to cause the client device 106B to perform one or more actions.

In FIG. 4A, the user of the client device 106B has inputted and submitted an electronic communication 480 of "Want to see a movie tonight?". The electronic communication 480 is submitted to a user "Sally", who may be the user of the client device 106A. In response to the submission of the electronic communication 480, one of four different status notifications 482A-D is transmitted to the client device 106B as an "automated reply" from "Sally". For example, the computing device 106A or the electronic communications system 110 of FIG. 1 may receive the electronic communication 480 and transmit one of the status notifications 482A-D in response.

The four different status notifications 482A-D are illustrated in broken lines in FIG. 4A to convey that only one of the four will actually be received at the client device 106B in response to transmission of the electronic communication 480. However, four different status notifications 482A-D are displayed to illustrate that in some implementations, which of the four is received may be dependent on whether the user of the client device 106B satisfies one or more trust criteria. For example, status notification 482A provides a particular status and a particular predicted duration and may be provided if the user of the client device 106B satisfies all trust criteria. Status notification 482B includes the particular status, but does not specify the predicted duration, whereas status notification 482C includes the predicted duration, but includes a generic status. Status notifications 482B and 482C are examples of status notifications that may be received if the user of the client device 106B satisfies some, but not all, trust criteria. Status notification 482D includes only a generic status and is an example of a status notification that may be received if the user of the client device 106B does not satisfy any of the trust criteria.

In FIG. 4B, the user of the client device 106B is viewing his/her contacts (e.g., in an electronic communications client application). Three contacts are displayed in FIG. 4B and include images 484A-C of the three contacts, as well as status notifications 486A-C for the three contacts. For example, contact "Sally" may be a user of the client device 106A and the status notification 486A may be provided to the client device 106B by the client device 106A directly and/or via the electronic communications system 110 (FIG. 1). In FIG. 4B, the user of the client device 106B is able to proactively view the status notifications and determine whether the contacts are currently available and, if not, determine their status and the anticipated duration of their status.

In FIG. 4C, the user of the client device 106B has used the client device 106B to call "Sally's" mobile phone. Sally's mobile phone may be, for example, the client device 106A of FIG. 1. In response to calling Sally's mobile phone, the status notification 488 for "Sally" is provided audibly to the user via the client device 106B (i.e., through a speaker of the client device 106B). In other implementations, the status notification 488 may additionally or alternatively be provided graphically. The notification 488 may be provided to the client device 106B by the client device 106A directly and/or via the electronic communications system 110 (e.g., it may be set as a voicemail managed by the electronic communications system 110) in response to receiving the call placed from the client device 106B.

Figure 4D:
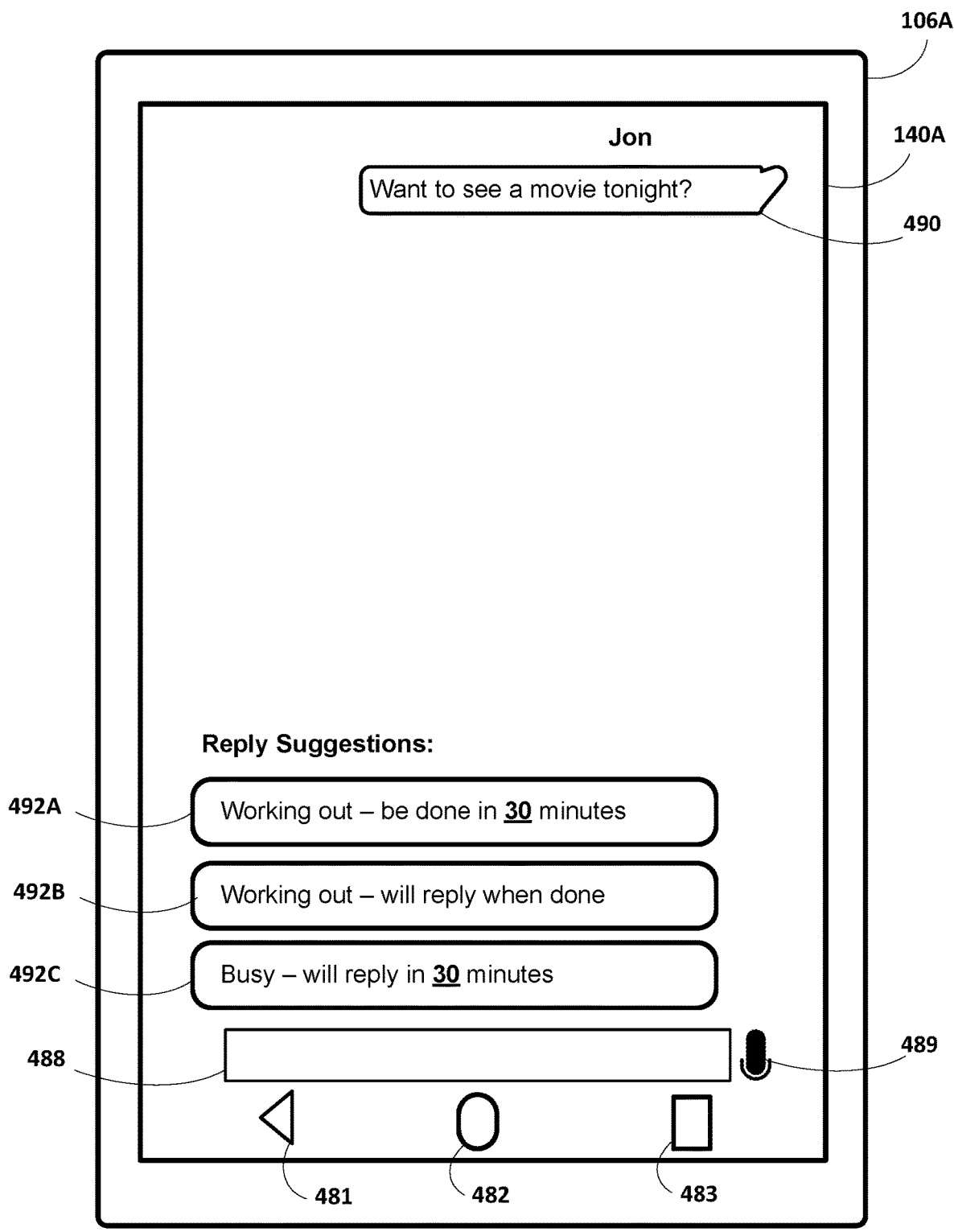
FIG. 4D illustrates another example client device, and illustrates an example of how status notifications of a user of the client device may be presented as reply suggestions to the user of the client device.
Figure 4E:
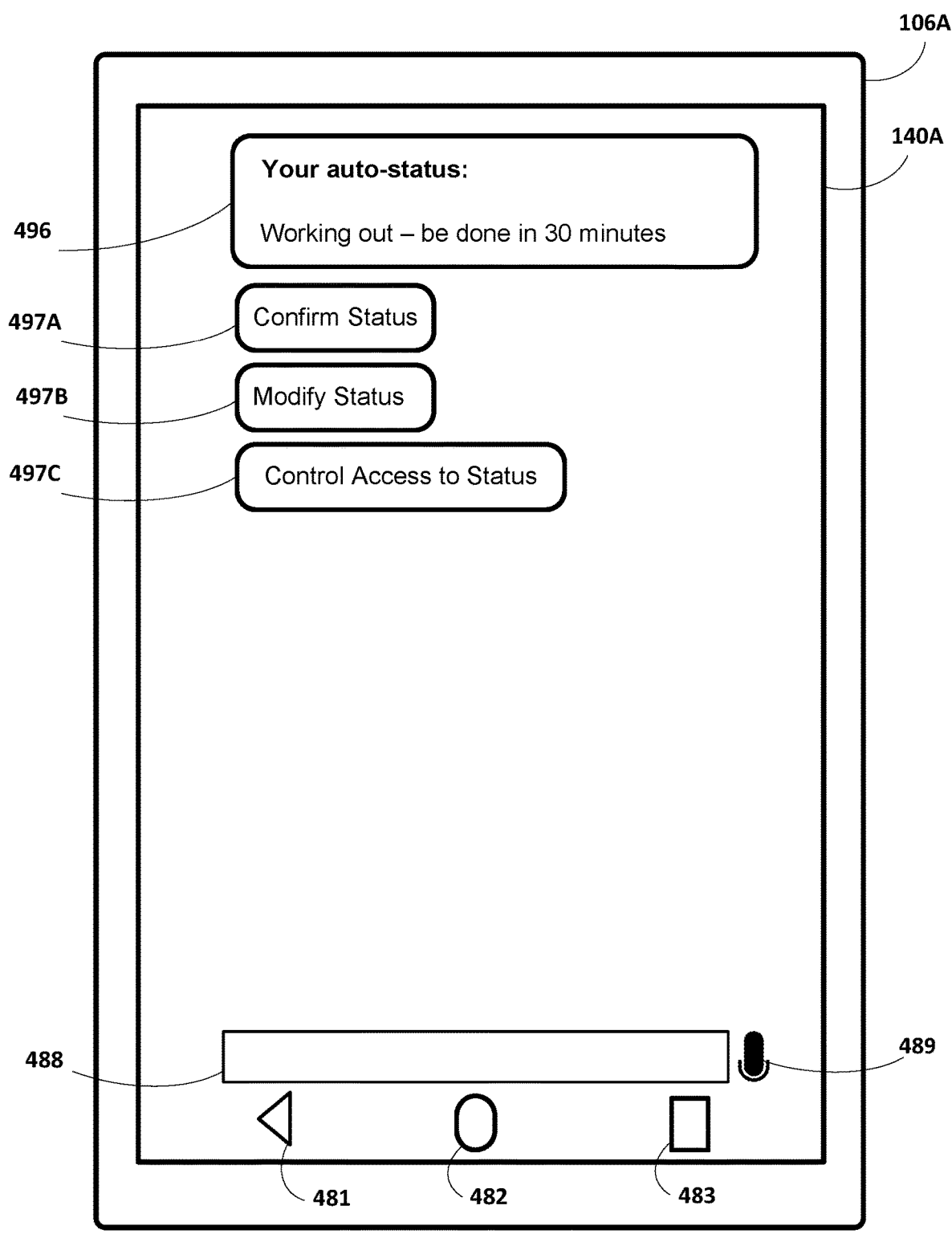
FIG. 4E illustrates the example client device of FIG. 4D, and illustrates an example of how a status notification of a user of the client device may be viewed, confirmed, modified, and access controlled by the user of the client device.

Turning now to FIGS. 4D and 4E, additional description is provided of various components and techniques described herein. FIGS. 4D and 4E each illustrate the example client device 106A of FIG. 1. The client device 106A of FIGS. 4D and 4E includes a display screen 140A that, like the display screen 140B of FIGS. 4A and 4B, includes a reply interface element 488, a voice reply interface element 489, and system interface elements 481, 482, and 483.

FIG. 4D illustrates an example of how status notifications of a user of the client device 106A may be presented as reply suggestions 492A-C to the user of the client device 106A. In FIG. 4D, another user, "Jon", has sent an electronic communication 490 to the user of the client device 106A. Reply suggestions 492A-C are presented to the user of the client device 106A as options for including in a reply to the electronic communication 490. The reply suggestions 492A-C are generated based on an automatically determined status of the user of the client device 106A. The reply suggestion 492A includes the particular status and the predicted duration, the reply suggestion 492B includes the particular status without specification of the predicted duration, and the reply suggestion 492C includes a generic status and the predicted duration. In response to selection (e.g., a single "tap" or other single user interface input) of one of the reply suggestions 492A-C, the content of the corresponding reply suggestion may be automatically populated in a reply electronic communication to be sent to "Jon". The reply electronic communication with the automatically populated content may be automatically sent to "Jon" in response to the selection, or further confirmation may be required prior to sending (e.g., further user interface input).

In FIG. 4D, "30" is underlined in the reply suggestions 492A and 492C. User selection of "30" may present a graphical element that enables the user to provide further user interface input and adjust the predicted duration. The adjusted predicted duration may then be utilized in the reply electronic communication. In some implementations, the adjusted predicted duration may further be provided as feedback for use in generating further training examples for refining a machine learning model as described herein.

FIG. 4E illustrates an example of how a status notification 496 of a user of the client device 106A may be viewed, confirmed, modified, and access controlled by the user of the client device 106A. Through selection of the graphical element 497A, the user may confirm the automatically determined status notification 496. In some implementations, the status notification 496 may not be presented to additional users until the user has confirmed the status notification 496. In some other implementations, the status notification 496 may be presented to additional users prior to confirmation, but the confirmation may still be utilized as an instance of positive feedback (e.g., to generate a positive training example).

In response to selection of the graphical element 497B, the user may be presented with a further graphical element that enables modification of the status and/or duration of the status notification 496. If modified, the modified status notification may then be utilized in lieu of the status notification 496. Further, the modified status notification may further be provided as feedback for use in generating further training examples for refining a machine learning model as described herein.

In response to selection of the graphical element 497C, the user may be presented with a further graphical element that enables a user to control which additional users have access to the status notification 496 and/or to control whether other version(s) of the status notification 496 should be shown to some/all additional users (e.g., with a generic status and/or without a predicted duration). In some implementations, the further graphical element enables the user to adjust access control to the status notification 496 in particular, to classes of status notifications (e.g., all "working out" status notifications), and/or to all status notifications. In some implementations, the access control can be set on an additional user by additional user basis and/or on a group basis (e.g., "family" contacts can view detailed status notification, "other" contacts can view generic status and predicted duration, non-contacts can't view status notifications at all).

Figure 5A:
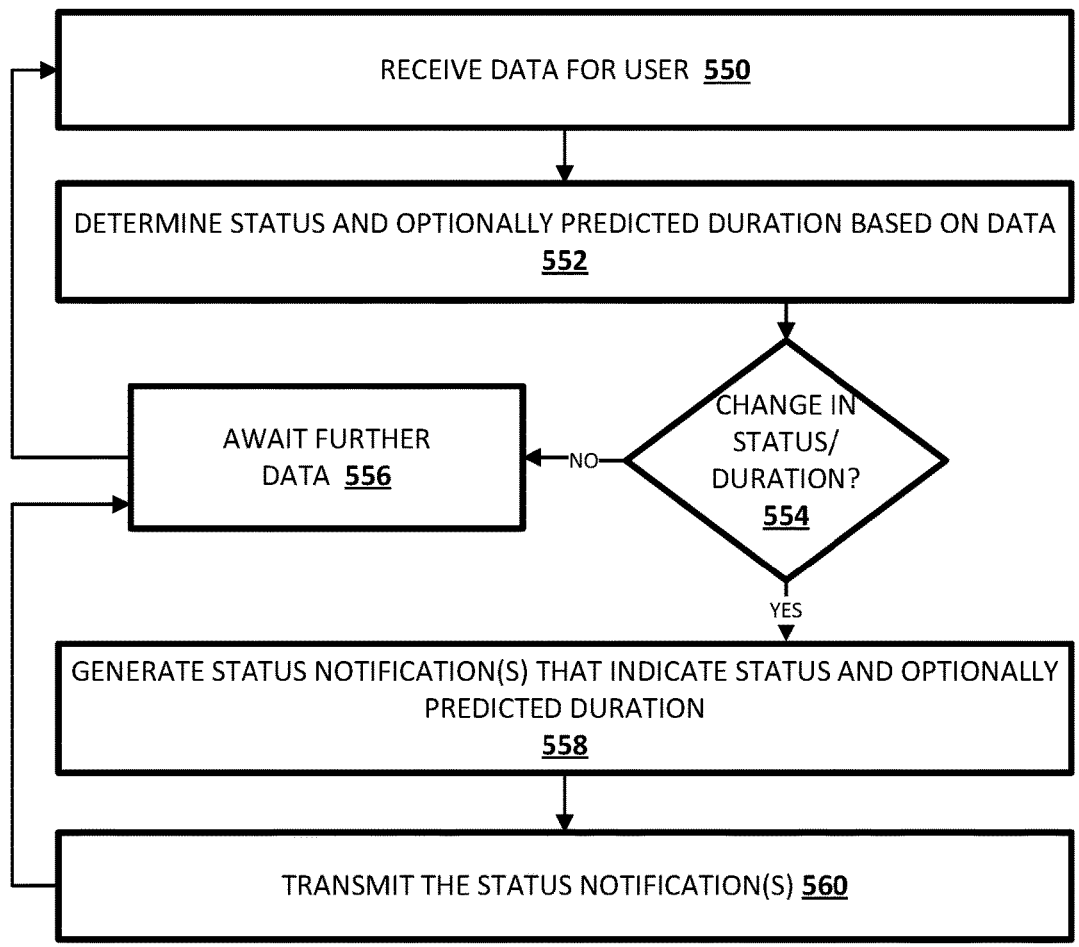
FIG. 5A is a flowchart illustrating an example method of generating and transmitting status notification(s) according to implementations disclosed herein.

FIG. 5A is a flowchart illustrating an example method 500 of generating and transmitting status notification(s) according to implementations disclosed herein. For convenience, the operations of the flow chart are described with reference to a system that performs the operations. This system may include various components of various computer systems, such as one or more components of status notification system 120. Moreover, while operations of method 500 are shown in a particular order, this is not meant to be limiting. One or more operations may be reordered, omitted or added.

At block 550, the system receives data for a user.

At block 552, the system determines a status based on the data. In some implementations, the system also determines a predicted duration of the status based on the data.

At block 554, the system determines whether the determinations of block 552 indicate a change to a currently active determined status and/or duration. If not, the system proceeds to block 556 and awaits further data.

If so, the system proceeds to block 558 and generates one or more status notifications that indicate the status and optionally the predicted duration.

At block 560, the system transmits the status notification(s) generated at block 558.

Multiple iterations of blocks 550, 552, 554, 556, 558, and 560 may occur to enable status notifications to be dynamically generated and/or transmitted to reflect a dynamically changing status and/or anticipated duration of a status for a user.

Figure 5B:
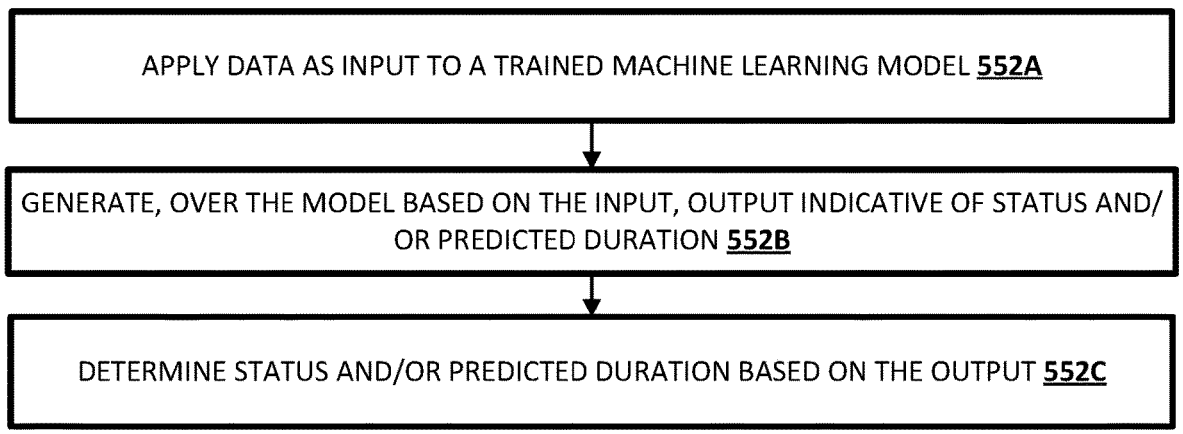
FIG. 5B is a flowchart illustrating an example of one block of the flowchart of FIG. 5A.

FIG. 5B is a flowchart illustrating an example of implementations of block 552 of the method 500 in additional detail. While the operations of the flowchart of FIG. 5B are shown in a particular order, this is not meant to be limiting. One or more operations may be reordered, omitted or added.

At block 552A, the system applies the data of block 550 as input to a trained machine learning model.

At block 552B, the system generates, over the model based on the input, output that is indicative of a status and/or a predicted duration of the status. For example, the output generated over the model may directly indicate the status and directly indicate the predicted duration of the status. As another example, the output generated over the model may directly indicate the status without directly indicating the predicted duration. In some of those examples, the system may use the status and optionally other data to determine the predicted duration. For example, the system may apply the status and other data to an additional trained machine learning model and generate, over the additional model based on the input, output that directly indicates the predicted duration.

At block 552C, the system determines the status and/or the predicted duration based on the output generated at block 552B.

Figure 6:
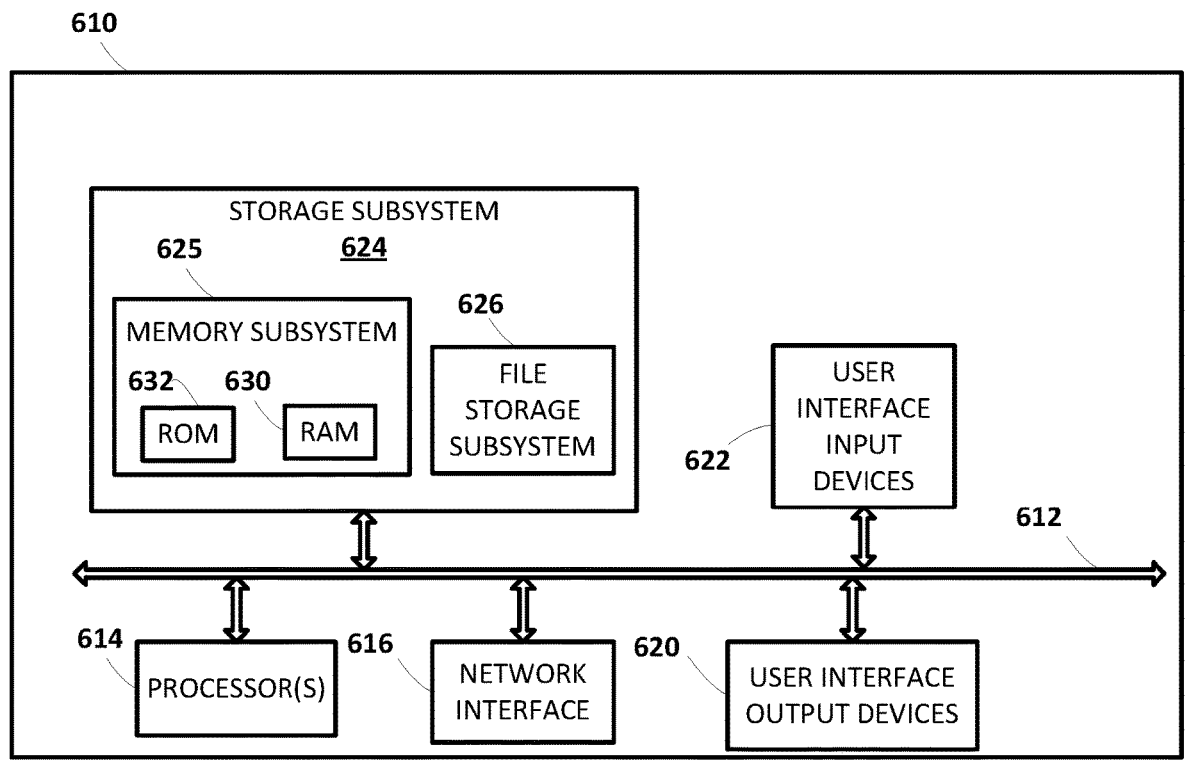
FIG. 6 illustrates an example architecture of a computing device.

FIG. 6 is a block diagram of an example computing device 610 that may optionally be utilized to perform one or more aspects of techniques described herein. In some implementations, one or more of the client computing devices 106A-N, status notification system 120, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 5A.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   receiving, by a computing device of a user, an electronic communication over a network interface, the electronic communication being sent to the user by an additional user, and the electronic communication being authored by the additional user via an additional computing device of the additional user;
   receiving data for the user, the data including current sensor-based data that is generated based on output from one or more sensors of one or more electronic devices of the user;
   determining, based on the data, a particular activity engaged in by the user;
   determining, based on the data, a predicted duration of the particular activity engaged in by the user, wherein:
      the predicted duration is determined by a machine learning model, the machine learning model trained based on at least in part on past sensor-based data of the user and user-provided modifications to previously predicted durations determined based on the past sensor-based data of the user,
      the predicted duration being associated with a confidence score above a certain threshold, and
      the predicted duration is determined based on the data and without determining or using the determination of the particular activity engaged in by the user;
   generating a status notification that indicates the particular activity engaged in by the user and that indicates the predicted duration of the particular activity engaged in by the user; and transmitting, by the computing device of the user, the status notification over the network interface, the status notification being transmitted responsive to the received electronic communication and being directed to the additional user,
      wherein transmitting the status notification over the network interface causes presentation of the status notification to the additional user via the additional computing device of the additional user.

2. The method of claim 1, wherein determining the predicted duration comprises determining the predicted duration independent of any direct data that directly indicates the duration.

3. The method of claim 1, wherein determining the predicted duration comprises determining the predicted duration independent of any calendar entry of the user that directly indicates the duration.

4. The method of claim 1, wherein determining the predicted duration is based on indirect data of the data, wherein the indirect data does not directly indicate the duration.

5. The method of claim 1, wherein determining the predicted duration comprises:
   applying the data as input to a machine learning model;
   generating output over the machine learning model based on the input; and
   determining the predicted duration based on the output generated over the machine learning model.

6. The method of claim 5, wherein determining the particular activity engaged in by the user based on the data comprises determining the particular activity engaged in by the user based on the output generated over the machine learning model.

7. The method of claim 5, wherein the predicted duration is indicated directly by the output generated over the machine learning model.

8. The method of claim 7, wherein the data applied as input to the machine learning model includes historical data that indicates historical duration, for the user, for one or more activities.

9. The method of claim 1, wherein transmitting the status notification over the network interface comprises:
   transmitting the status notification to at least one electronic communications server managing an electronic communications system to cause the electronic communications server to update a current status of the user in the messaging system based on the status notification, wherein the updated current status is transmitted by the electronic communications server to the additional computing device of the additional user to present the current status to the additional user via the additional computing device.

10. The method of claim 1, wherein transmitting the status notification over the network interface comprises transmitting the status notification as an audio signal for audible presentation to the additional user.

11. A method, comprising:
by one or more processors of a client device of a user:
receiving, by the client device of the user, an electronic communication sent to the user by an additional user, the electronic communication being authored by the additional user via an additional client device of the additional user;
receiving data for the user, including current sensor-based data generated based on output from one or more sensors, the sensors being of the client device or an additional electronic device in network communication with the client device;
applying the data as input to a status prediction machine learning model and as input to a duration prediction machine learning model, wherein:
the status prediction machine learning model is trained to predict a status of the user without predicting or using a predicted duration of the status of the user,
the duration prediction machine learning model is trained to predict a duration corresponding to the status of the user without predicting or using the predicted status of the user, and
the status prediction machine learning model and the duration prediction machine learning model are both stored locally on the client device of the user,
wherein the duration prediction machine learning model is trained based on past user data, including past sensor-based data, and user-provided modifications to previous predicted durations determined based on the past user data;
generating outputs associated with a confidence score above a certain threshold by the duration prediction machine learning model and the status prediction machine learning model based on the inputs; and
determining, based on the outputs generated by the duration prediction machine learning model and the status prediction machine learning model, a status of the user and a predicted duration of the status of the user, wherein both the status and the predicted duration of the status are indicated directly by the outputs; and
transmitting, over a network via a network interface of the client device, and responsive to the received electronic communication, the status and the predicted duration to one or more additional client devices, including at least the additional client device of the additional user.

12. The method of claim 11, wherein the data applied as input to the duration prediction machine learning model includes historical data that indicates historical duration of the user for one or more activities.

13. A method implemented by one or more processors, comprising:
receiving an electronic communication sent to a user by an additional user;
receiving current data for the user;
determining a particular activity engaged in by the user based on the current data;
determining whether the additional user satisfies one or more trust criteria with respect to the user, wherein determining whether the additional user satisfies the one or more of the trust criteria with respect to the user is based at least in part on determining that the additional user satisfies the one or more trust criteria with respect to at least two of:
a trust level previously designated by the user for the additional user,
a frequency of communication between the user and the additional user, and
a prior responsive electronic communication transmitted to the additional user including a prior particular activity previously engaged in by the user;
if it is determined that the additional user satisfies the one or more trust criteria with respect to the user:
transmitting, to an additional computing device of the additional user over a network interface, and responsive to the received electronic communication:
a first status notification that identifies the particular activity; and
if it is determined that the additional user fails to satisfy one or more of the trust criteria with respect to the user:
transmitting, to the additional computing device of the additional user over the network interface, and responsive to the received electronic communication:
a different status notification that does not identify the particular activity.

14. The method of claim 13, further comprising:
determining a predicted duration of the particular activity based on the data;
wherein the first status notification further includes the predicted duration based on determining that the additional user satisfies the one or more trust criteria with respect to the user.

15. The method of claim 1, wherein the status notification is automatically transmitted to the additional user in response to receiving the electronic communication.

16. The method of claim 1, wherein the status notification is transmitted to the additional user in response to receiving a selection, of the status notification, from a plurality of suggested status notifications, wherein the selection is from the user via a user interface of the computing device of the user.

* * * * *